United States Patent [19]

Call et al.

[11] 4,012,720
[45] Mar. 15, 1977

[54] DATA ENTRY SYSTEM

[76] Inventors: James Call, 304 Fenimore Road, Mamaroneck, N.Y. 10543; John Robertson, 174 Caldwell St., Chillicothe, Ohio 45601

[22] Filed: Sept. 25, 1975

[21] Appl. No.: 616,842

[52] U.S. Cl. .................. 340/172.5; 235/61.11 A
[51] Int. Cl.² .......................................... G06F 3/00
[58] Field of Search ............... 340/172.5; 445/1; 235/61.6 R, 61.11

[56] References Cited

UNITED STATES PATENTS

| | | | |
|---|---|---|---|
| 3,346,853 | 10/1967 | Koster et al. | 340/172.5 |
| 3,609,695 | 9/1971 | Pirkle | 340/172.5 |
| 3,727,190 | 4/1973 | Vogelman et al. | 340/172.5 |
| 3,839,708 | 10/1974 | Bredesen et al. | 340/172.5 |
| 3,847,345 | 11/1974 | Moldovan et al. | 235/54 |

*Primary Examiner*—Mark E. Nusbaum
*Attorney, Agent, or Firm*—Hubbell, Cohen, Stiefel & Gross

[57] ABSTRACT

A data entry system for providing a computer readable record of historical information, such as market survey information, relating to at least one common subject, such as a particular product, having a plurality of different possible attributes, such as price, store in which purchased, etc., with the attributes having a plurality of different selectable definitions, such as different store names, different price values, etc. The system comprises at least one electrical crosspoint matrix array with each of the crosspoints having an associated indicia corresponding to one of the selectable definitions and having bit state corresponding to the absence of the associated definition and a different bit state corresponding to the presence of the associated definition. Addressable temporary storage means, such as a random access memory, having a plurality of different bit addresses with a unique bit address being associated with each of the bits associated with the crosspoints is provided, with the temporary storage means being selectively connectable to each of the crosspoints for recording the state of the associated bit at the unique associated bit address therefor. An electrical contact probe is provided for selectively changing the state of the bit associated with a crosspoint by selective contact therewith. The temporary storage and the crosspoint matrix array are synchronously scanned for selectively connecting each of the crosspoints to its associated unique bit address to provide the state of the associated bit thereto at the time of the synchronous scan of the crosspoint so as to provide a bit value map of the crosspoint array in the temporary storage. The bit value map is selectively dumped from temporary storage to a permanent magnetic storage, such as a multichannel tape, the permanently stored map being computer readable for providing a computer readable historical information record relating to the subject. A plurality of such crosspoint matrix arrays may be time division multiplexed to provide a common permanent storage record thereof.

9 Claims, 18 Drawing Figures

PRICE $ | CENTS 0 0 0
1 1 1
2 2 2
3 3 3
4 4 4
5 5 5
6 6 6
7 7 7
8 8 8
9 9 9

SIZE
(OUNCES)

NOT REF.
6½
7
8
9
10
11
12
16
26
27
28
32
48
64
128

FLAVOR

NOT REP. OR MIXED
BLACK CHERRY
CHERRY
CHERRY COLA
CHOCOLATE
CITRUS
COFFEE
COLA
CREAM
GINGER ALE
GRAPE
LEMON COLA
LEMON & LIME
ORANGE
ROOT BEER
STRAWBERRY
MIXES
ALL OTHER FRUIT
ALL OTHER FLAVORS 144
160

FIG. 4B.

STORE

| NOT REPT. | FISHER | P&C | WINN DIXIE | GEX |
| UNKN'N GROC'Y | FOOD BASK. | PENN FRUIT | ALL OTHER | G.E. |
| ACME | FOOD FAIR | PENNY FARE |  | WOOLCO |
| ALBERTSONS | FOOD GIANT | PICK N PAY | GRAY |  |
| ALLIED | FOOD KING | PUBLIX | LIGGET | SEARS |
| ALOHA BETA | FRED M. | PUEBLO | PEOPLES | MW |
| A&P | GIANT FOOD | RALPH'S | REXALL | SPIEGELS |
| ARDEN MAYFAIR | GRAND UNION | RED & WHITE | SUPER X | J.C.PENN. |
| BASHA NAT'L | GRAND WAY | RED OWL | THRIFT | ALDENS |
| A.J. BAYLES | HEB. | SAFEWAY | THRIFTY |  |
| BIG BEAR | HENKE PILOT | SAVE RITE | UNITED WHELAN | AVON |
| BIG D | HILLS | SHOP BAGS | WALGREEN | FULLER |
| BIG VALUE | HUMPTY DUMPTY | SHOP RITE |  | JEWEL |
| BOHACK | I.G.A. | SMITHS | J.C. PENN. | A.O. |
| BOYS | IMP. | S.T.D. | SEARS |  |
| BRAD | JEWEL | STAR | GRT EASTERN | S&H |
| BUTT | KINGS | STAR N.Y. | ALEX. | BLUE C. |
| CENTURY | KINGS SOOPER | STOP/SHOP | MNT. WARD | YEL.ST. |
| CERT. | KOHL'S | SUPER SAVER |  | T.V. |
| CHAM. | KROGER | VILLAGE | WOOL WORTH | GOLD |
| CLOVER FARM | KWIK CHECK | THOROF | GRANTS | REGAL |
| COLONIAL STORES | LOBLAW | THRIFTI MART | KRESGE | HOBBY |

¢ OFF

| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

KIND OF SPECIAL

*FIG. 4C.*

- ○ NO SPECIAL PRICE
- ○ REDEEMED COUPON FROM NEWSPAPER
- ○ REDEEMED COUPON FROM MAGAZINE
- ○ REDEEMED COUPON REC'D IN MAIL
- ○ COUPON FROM PRIOR PURCHASE OF SAME ITEM
- ○ COUPON REC'D WITH OTHER PURCHASE
- ○ SPECIAL PRICE
- ○ FREE SAMPLE OR GIFT
- ○ STORE SALE
- ○ MFG'S SALE (INTRODUCTORY) PRINTED ON PKGE AS ¢ OFF
- ○ COUPON
- ○ STORE SALE & COUPON
- ○ STORE SALE & PREMIUM
- ○ STORE SALE & MFG'S. SALE
- ○ COUPON & PREMIUM
- ○ MFG'S SALE & COUPON
- ○ STORE COUPON
- ○ REDEEMED MORE THAN ONE COUPON
- ○ REDEED MORE THAN ONE COUPON AND STORE SALE
- ○ COUPON REDEEMED, FULL VALUE APPLIED TO 2 TRANSACTIONS
- ○ COUPON REDEEMED, FULL VALUE APPLIED TO 3 TRANSACTIONS

- ○ TOTAL GROCERY BILL DISCOUNT
- ○ DISCOUNT
- ○ BOUGHT JOINTLY WITH ONE OTHER PRODUCT
- ○ PREMIUM
- ○ BUY 1, GET 1 FREE
- ○ BUY 2, GET 1 FREE
- ○ BUY 3, GET 1 FREE
- ○ BUY 4, GET 1 FREE
- ○ BUY 5, GET 1 FREE
- ○ BUY 1, GET ONE FOR 1¢
- ○ PARTIAL REFUND OFFER
- ○ COMPLETE REFUND OF PURCHASE PRICE OFFER
- ○ MORE OF SAME PRODUCT FREE
- ○ MORE OF SAME PRODUCT FREE & STORE SALE
- ○ MORE OF SAME PRODUCT FREE & COUPON
- ○ ½ PRICE SALE
- ○ BUY ONE AT REG. PRICE GET 2ND @ ½ PRICE
- ○ SAME AS ABOVE & COUPON
- ○ DAMAGED MERCHANDISE
- ○ ¢ OFF, REASON UNKNOWN
- ○ ALL OTHER SPECIALS

UNITS 126
- ○ 0
- ○ 1
- ○ 2
- ○ 3
- ○ 4
- ○ 5
- ○ 6
- ○ 7
- ○ 8
- ○ 9

FIG. 6.

DATA ENTRY SYSTEM

BACKGROUND OF THE INVENTION

1. Field of the Invention

The present invention relates to data entry systems for providing computer readable records.

2. Description of the Prior Art

Data entry systems of many different types have been available as long as the recording of information has been desired. With the advent of the computer, the sophistication of data entry systems so as to provide computer readable records has increased. Computer readable records may be in many different formats, such as keypunch cards which are fed to a computer to be read thereby, magnetic disc storage which can be read by computer or magnetic tape which can be read by computer. The information is normally stored on cards from a keypunch in an alphanumeric ASCII code or in binary coded decimal (BCD) and, similarly, the information may be stored in some binary data format on a disc or a tape. Examples of such prior art data entry systems are disclosed in U.S. Pat. Nos. 3,852,716; 3,223,979; 2,333,463; 3,535,467; 3,000,555; 2,987,704; 2,933,469; 2,850,719; 2,793,806; 3,144,549; 3,533,071; and 3,832,733. Some of these prior art systems, such as in the type commonly termed "point-of-sale" systems, utilize plug board inputs to a computer to provide a computer readable record, such as disclosed in U.S. Pat. No. 3,852,716. An example of such a system is one presently in use at some of the franchised hamburger stands operated by McDonald's Corp. In those systems a probe or plug board is directly interconnected with a computer for automatically recording the sale and providing the appropriate pricing information relating thereto. With respect to the provision of historical information records, such as market survey information, concerning products purchased by consumers, price paid, where bought, etc., the prior art mode of recording this information was customarily to assign a number code to each possibility, and thereafter record this number on forms which were subsequently keypunched on to cards for ultimate computer input. However, it required a laborious effort requiring many keypunch operators to record all of this information from a representative sample group upon which the market survey was being conducted, and was time consuming requiring many manual operations to keypunch the multidigit codes assigned to different products and their associated attributes. Furthermore, such a system gave rise to the possibility of errors in misreading or mispunching various codes, as well as being time consuming so as to not optimize the time required to provide a computer readable record of this information. These diadvantages of the prior art are overcome by the system of the present invention.

SUMMARY OF THE INVENTION

The present invention is a data entry system for providing a computer readable record of historical information, such as market survey information, relating to at least one common subject, such as a particular product, having a plurality of different possible attributes or general categories thereof such as, by way of example, price, store at which purchased, units, kind of special, and where appropriate, size, cents off regular price, and flavor. At least two of the different attributes or general categories thereof each comprises a plurality of different selectable definitions or specific attributes, such as, for example, different numerical values of price, different names of stores, different values of units, different kinds of specials, such as redeemed coupons, or half price sale, different quantitative values of size, different numerical values of cents off the regular price, or different names of flavors. The system comprises at least one electrical crosspoint matrix array of a plurality of open circuit electrical contact crosspoints with each of the crosspoints having an associated indicia corresponding to one of the selectable definitions for one of the possible attributes. The crosspoints each have an open circuit state corresponding to one value of a digital data bit corresponding to the absence of the associated definition of the attribute associated with that crosspoint and a closed circuit state corresponding to a different value of the digital data bit corresponding to the presence of the associated definition of the attribute associated with that crosspoint. Addressable temporary storage means, such as an erasable random access memory, having a plurality of different bit addresses, with a unique bit address being associated with each of the bits respectively associated with the crosspoints, is selectively connectable to each of the crosspoints for recording the state of the associated bit at the unique associated bit address therefor for recording the presence or absence of the associated definition of the attribute associated with that crosspoint. The value of the bit associated with a crosspoint is selectively changed by selectively contacting the crosspoint with an electrical contact probe. Means are provided for synchronously scanning the temporary storage and the crosspoint matrix array for selectively connecting each of the crosspoints to its associated unique bit address to provide the value of the associated bit thereto at the time of the synchronous scan of the crosspoint for providing a bit value map of the crosspoint array in the temporary storage. The crosspoint array bit value map is subsequently permanently stored on a magnetic storage means, such as a multichannel magnetic tape, and is computer readable for providing a computer readable historical information record. Means are operatively connected between the temporary storage means and the permanent storage means for selectively dumping at least the temporarily stored crosspoint array bit value map to the permanent magnetic storage means for permanent storage thereof, with the temporary storage being erased when the temporarily stored crosspoint array bit value map is selectively dumped to the permanent magnetic storage. The temporary storage is thereafter ready for entry of the next desired historical record via the crosspoint array and electrical contact probe.

The probe may preferably comprise a signalling means such as a signal lamp or an audible sound, for providing an indication to an operator thereof that the data bit associated with the crosspoint being contacted by the probe at a particular time has been loaded into the temporary storage means. The signalling means is enabled to provide this indication when the probe contacted crosspoint is synchronously scanned to selectively connect the crosspoint to the unique bit address in the temporary storage means associated therewith. This synchronous scan of the crosspoint completes a feedback circuit to the signalling means to enable the provision of the indication therefrom, with the feedback circuit including delay means having an associated holding time which is selected to maintain the indication provision for a sufficient time to insure observation thereof by the operator.

At least one removable overlay mask for a portion of the crosspoint matrix array may be provided to enable self-editing of the market survey information being entered. For market survey information, the overlay is preferably associated with a given brand of the product for which some of the definitions of the attribute normally associated therewith are invalid. The crosspoint matrix array includes means, such as an edge reader, for removably retaining the overlay mask in juxtaposition with the crosspoint matrix array with the removably retained overlay preventing the probe from selectively contacting such invalid definitions. Such an overlay mask preferably includes a readable portion containing the brand attribute definition in a digital data bit format, with the mask retaining means preferably comprising means, such as an optical reader, for reading the mask readable portion of the retained mask in order to provide the brand attribute definition bit format to the unique bit address or addresses therefor in the temporary storage means as a portion of the bit value map temporarily stored therein.

The data entry system may also preferably include an auxiliary data source, such as a keyboard input for providing a record of relatively stable information common to a plurality of different subjects, such as the date of entry of the information and an indentification number for the operator entering this information. Such a keyboard preferably has a digital output corresponding to the relatively stable information. In such an instance, the selective dumping means is operatively connected between the keyboard means and the permanent storage means for simultaneously providing the keyboard digital output to the permanent storage means along with the temporarily stored crosspoint array bit value map when the temporarily stored bit value map is selectively dumped so as to provide a homogeneous computer readable record. As previously mentioned, the permanent magnetic storage means preferably comprises a multichannel magnetic tape having a plurality of data storage channels. The permanent magnetic storage means includes means for recording the permanently stored crosspoint array bit value map in a portion of the plurality of channels and the keyboard digital output in another portion of the plurality of channels for providing the homogeneous multichannel computer readable record.

If desired, a plurality of the crosspoint matrix arrays each having a separate associated addressable temporary storage means, a separate associated probe, and a separate associated selective dumping means may be associated with a common permanent magnetic storage means. In such an instance, the synchronous scanning means preferably includes time division multiplexing means common to all of the matrix arrays and their associated temporary storage means and selective dumping means for providing a time division multiplexed storage of the plurality of temporarily stored crosspoint array bit value maps as well as a time division multiplexed selective dumping thereof to provide a time division multiplexed computer readable record of the plurality of selectively dumped temporarily stored bit value maps on the common permanent magnetic storage means by enabling the selective dumping thereto in accordance with the time division multiplexing. If desired, timing means may be included with the permanent magnetic storage means for providing an independent timing record on the permanent storage tape at preselected intervals to enable subsequent efficiency analysis of the data entry system operation.

BRIEF DESCRIPTION OF DRAWINGS

FIGS. 4A through 4E are illustrative plan view of typical indicia bearing product attribute cards which may be utilized with the crosspoint matrix array board of FIG. 3;

FIGS. 5A and 5B are illustrative plan view of other typical product attribute cards utilizable with the crosspoint matrix array board of FIG. 3;

FIG. 6 is an illustrative plan view of a typical product overlay mask card utilizable with the crosspoint matrix array board of FIG. 3;

DETAILED DESCRIPTION OF THE PREFERRED EMBODIMENT

General System

Figure 1:
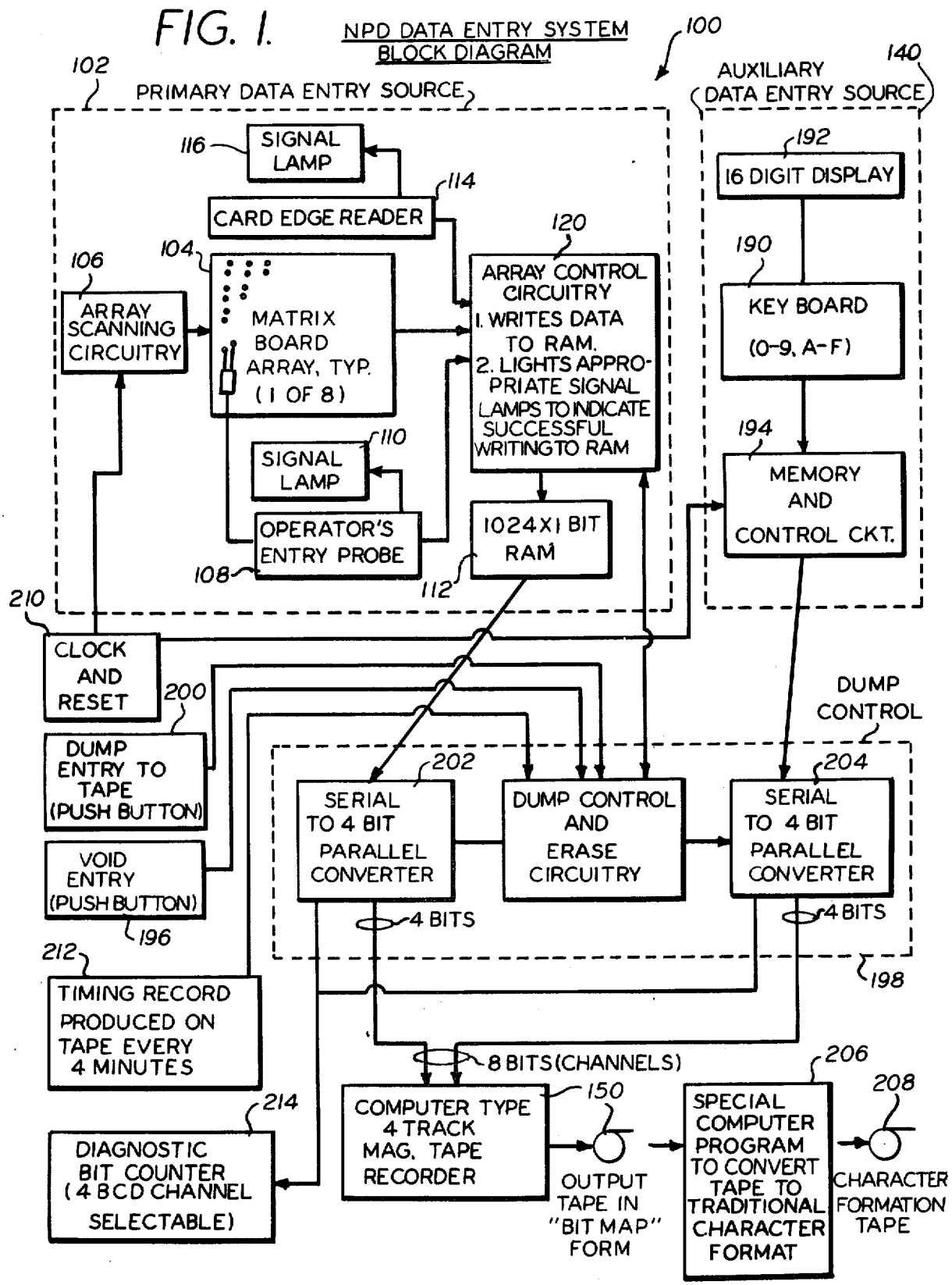
FIG. 1 is a functional block diagram of the preferred overall data entry system of the present invention.

Referring now to the drawings in detail and initially to FIG. 1 thereof, a functional block diagram of the overall preferred data entry system of the present invention; generally referred to by the reference numeral 100, is shown. The data entry system 100 of the present invention is preferably utilized to encode in a computer readable form any type of information which must be transferred or stored for subsequent computer analysis and is most preferably utilized for recording information obtained from documents, such as market research questionnaires, survey forms, or in response to telephone or verbal surveys so as to provide historical information, such as this market survey information, relating to one or more common subjects, such as particular products, having a plurality of different possible attributes, such as price, store in which purchased, units, kind of special, size where applicable, cents off regular price where applicable and flavor where applicable. In order to provide this computer readable historical record, the data entry system 100 of the present invention preferably includes a primary data entry source 102 which shall be described in greater detail hereinafter with reference to FIGS. 2, 3, 4A through 4E, 5A, 5B and 6 through 8. The primary data entry source 102 preferably includes at least one crosspoint matrix array board 104, such as a 32-by-32 matrix array, to be described in greater detail hereinafter, although, as will be described in greater detail hereinafter a plurality, such as eight, of these matrix array boards 104 may be time division multiplexed; scanning circuitry 106 for the array, to be described in greater detail hereinafter; an electrical contact probe or operator's entry probe 108 for setting the data to be entered on the matrix array board 104; a signal lamp 110 contained in a feedback path with the probe 108 and the array 104 for indicating to the operator that the data has been entered, as will be described in greater detail hereinafter; temporary storage for the data entered via the matrix array board 104, such as preferably a conventional random access memory 112, such as typically a conventional 1,024-by-one bit random access memory for a 32-by-32 matrix array board 104; a card edge reader 114 and associated signal lamp 116 for use with product overlay mask cards 118 to be described in greater detail hereinafter with reference to FIGS. 3 and 6; and array control circuitry 120, to be described in greater detail hereinafter, which preferably controls the writing or loading of data from the matrix array board 104 and the card edge reader 114 (if a product overlay mask card 118 is used) into the proper bit addresses in the random access memory (RAM) 112 as well as enabling the lighting of the appropriate signal lamps 110 and 116 to indicate successful writing or loading of this information into the RAM 112.

Primary Data Entry Source

Figures 2, 3:
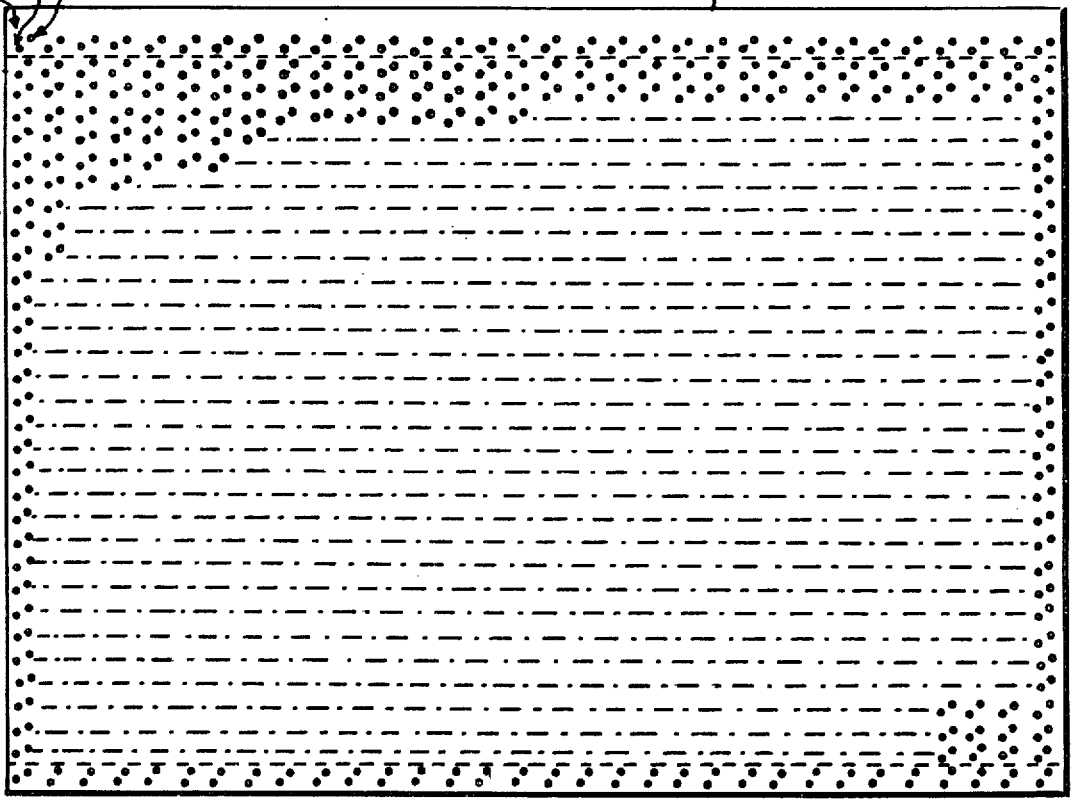
FIG. 2 is an illustrative plan view of a typical preferred crosspoint matrix array board utilized in the system of FIG. 1.
FIG. 3 is another illustrative plan view of the crosspoint matrix array board of FIG. 2 with the board arranged for the entry of typical market survey information in the system of FIG. 1.

Referring now to FIGS. 1–3, typical electronic crosspoint matrix array board 104 is preferably composed of pairs of electrical contacts or touch points 122a–122b, by way of example, laid out in a row and column matrix array, which is preferably a 32-by-32 row and column matrix array, although any other desired bit capacity may be provided with the associated random access memory 112 capacity corresponding thereto. As will be described in greater detail hereinafter, in operation these crosspoints 122a–122b located throughout the crosspoint matrix array 104 are preferably defined and labeled with indicia so as to represent or correspond to certain attributes of the information to be entered, such as the product attributes shown by way of example in FIG. 3 and in FIGS. 4A through 4E and 5A and 5B. Preferably, these product attributes are contained on removable product attribute cards, such as cards 124 through 134 which are conventionally removably mountable, such as via conventional contact adhesive or hooks, onto the surface of matrix board 104 so as to overlay the appropriate contact crosspoints, with through holes being provided in the various product attribute cards 124 through 134 so as to expose each of the crosspoints, each composed of the contact pair 122a–122b, adjacent to an indicia or label providing a definition of that attribute. For example, referring to product attribute card 128 describing PRICE, this card is illustratively shown as divided into dollars and cents indicia with appropriate indicia 0 through 9 in the units column of the dollars portion, 0 through 9 in the tens column of the cents portion and 0 through 9 in the units column of the cents portion of the card 128, with these various indicia providing numerical definitions of the price attribute. Similarly, with respect to the STORE attribute card 134 illustratively shown in FIG. 4B, the various names of stores are provided as definitions of the store product attribute. With respect to the KIND OF SPECIAL product attribute card 130, the indicia provides definitions of the various kinds of normally available specials offered for the product upon which the historical information is being sought. Similarly, with respect to the CENTS OFF product attribute card 132, illustrated in FIG. 4D, the indicia provides numerical definitions of the cents-off the regular price with the tens column having indicia from 0 to 9 and the units column also having indicia from 0 to 9. With respect to the UNITS attribute card 126 illustrated in FIG. 4E, indicia provides numerical definitions in the number of units, such as in a column from 0 to 9. In addition, as is shown in FIG. 3 with respect to the DATE attribute card 124, which refers to the date upon which the purchase was made and normally does not vary and, as will be discussed in greater detail hereinafter, can be provided by means of a product overlay mask card 118, indicia from 0 to 30 may be provided as definitions of the date. It should be noted that each of the indicia is adjacent to a through hole which will expose an adjacent crosspoint and is preferably dimensioned so as to expose only that adjacent crosspoint next to the indicia. Furthermore, by using removable electrically insulated product attribute cards, as will be described in greater detail hereinafter, the data entry system 100 of the present invention is more flexible in that the various crosspoints can readily have their corresponding definitions altered with conventional adjustments being made in the appropriate conventional computer program utilized for subsequent analysis of the computer readable information provided thereby. By way of further example, FIG. 5A illustrates another typical product attribute card 142, for size, shown by way of example as being defined in ounces, with the various indicia defining various quantitative values of ounces, such as commercially available for soft drinks. As illustratively shown in FIG. 5B, another typical product attribute card 144 which may be utilized, such as if the product upon which the historical information is being provided is soft drinks, is one termed FLAVOR wherein the various indicia define different flavors, such as the ones illustrated in FIG. 5B, by way of example.

As was previously mentioned, the data entry system 100 is preferably utilized for recording historical information, such as market survey information which is obtained from market research questionnaires put out such as by a market survey organization. These questionnaires preferably contain the various product attributes and definitions which are defined on the product attribute cards, such as cards 126 through 134, as well as 142 and 144 where applicable, so that in entering the data, the operator merely extracts this information from these questionnaires and enters it in the manner to be described in greater detail hereinafter via the operator's data entry probe 108 and the matrix array board 104 which contains the indicia bearing product attribute cards, such as cards 126 through 123, as well as 142 and 144 where applicable, or any other applicable product attribute card, to define the various crosspoints whose location has been conventionally programmed to provide a computer readable historical record of this information.

As will be described in greater detail hereinafter, in utilizing the data entry system 100 of the present invention, the operator records the various product attributes by touching the appropriate crosspoint contact pair 122a–122b location with electrical contact probe 108, which is connected electrically to the data entry system 100 through the matrix array board 104 and array control circuit 120, so as to cause an appropriate digital data bit to be set or loaded in the random access memory 112. As will also be described in greater detail hereinafter, the contents of this random access memory 112, which is an eraseable temporary storage, is subsequently preferably transferred to a permanent storage device, such as preferably a conventional computer type multitrack or channel magnetic tape recorder 150 (FIG. 1) to produce a permanent computer readable record of this historical information. As will be further described in greater detail hereinafter with reference to the probe data entry, the signal lamp 110 associated with the probe 108 informs the operator that the information which was designated by electrically contacting the appropriate crosspoint 122a–122b on the matrix array board 104 has been successfully loaded into the random access memory temporary storage 112.

Before describing the data entry system 100 in greater detail, a typical comparison between a prior art manner of providing computer readable market survey data and the technique of the present invention will be described to provide a background for the subsequent detailed description. For example, in prior art recording of market research information concerning products purchased by consumers, such as price paid, where bought, etc, it was customary to assign a number code to each possibility, which code was then recorded on forms, which were then subsequently keypunched onto cards to provide a computer readable record. This information, as previously mentioned, is typically obtained from consumers by having them keep a diary or daily record or purchases, which record then becomes an input document for use with the data entry system 100 of the present invention or with prior art data entry systems. Thus, in such a prior art system, if the item purchased, for example, had a chocolate flavor, chocolate flavor might be assigned a code designation 12 as opposed to a different code designation for strawberry, such as 13. The operator would then have to record the number 12 to represent the chocolate attribute which number would then have to be keypunched on to a card along with the other information. In analyzing this data subsequently, a computer would conventionally isolate all chocolate purchases by finding all the 12 codes. However, in utilizing the preferred data entry system 100 of the present invention, the various product attribute cards, such as card 126 or 134 have indicia or labels which are provided physically on the face of the matrix array board 104 with, in the example given above, the flavor chocolate being defined by one of the crosspoints 122a–122b, as is shown on the FLAVOR product attribute card 144 by the chocolate definition 160. Thus, the operator, in order to record the purchase of a chocolate product in system 100, merely has to touch or contact the crosspoint 122a–122b adjacent the chocolate definition 160 with the electrical contact probe 108. The indicator lamp 110, which is preferably located on the probe 108 in easy view of the operator will then flash or be turned on upon successful loading of this information to the random access memory 112. The probe 108 for entering this information, preferably has an electrical contact which comprises a wire brush at the end of the probe to cause electrical contact when the crosspoint composed of electrical contact pairs 122a–122b are simultaneously touched or contacted by the wire brush portion of the probe 108 to complete the electrical circuit, the circuit preferably being open otherwise. As will be described in greater detail hereinafter, the closing of this circuit by the contacting of the probe 108 corresponds to one value of a digital data bit, such as the logic value 1, whereas the crosspoint when not contacted by the probe 108 provides an open circuit condition corresponding to another value of this digital data bit, such as the logic value 0.

Figure 6:
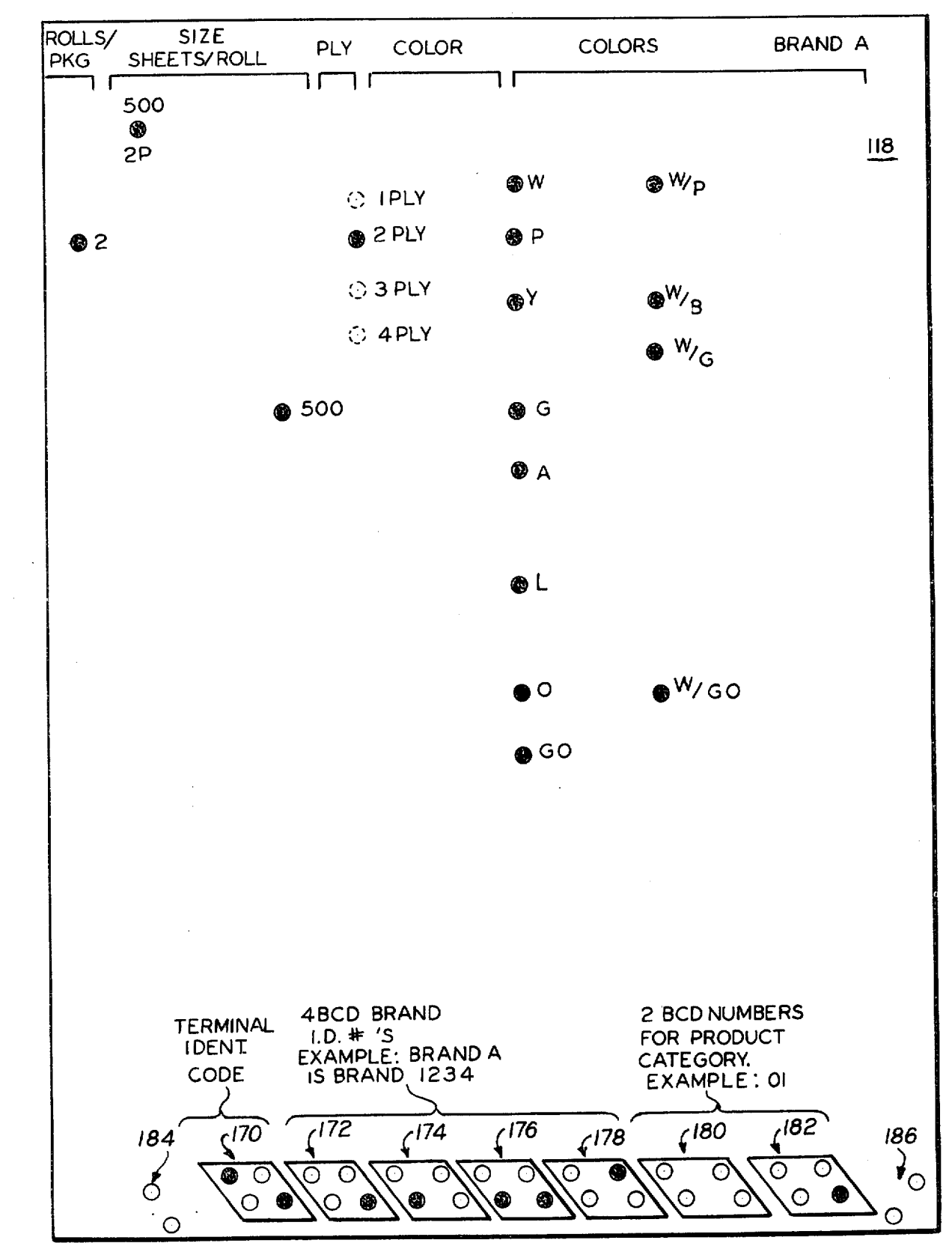

Now referring to FIGS. 3 and 6, the use of the product overlay mask card 118 shall now be described in greater detail. Much of the information normally recorded via the data entry system 100 of the present invention when it is utilized for recording market survey information, is of a rather stable structure. For example, the day of the month when the purchase is made may normally be stable for a variety of products purchased. However, certain other information is contingent on other overriding factors. For example, as illustratively shown in FIG. 6, a product such as toilet paper, by way of example, of a given brand, such as Brand A by way of example, may only come two rolls to a package, 500 sheets per roll only two ply, and may only come in certain colors such as white, yellow, green, lavender, and gold, while not being commercially sold in one ply, three ply, four ply or in other colors, such as pink, aqua and orange, for example, which are available for other brands of toilet paper. The use of the product overlay mask card 118 in such an instance, provides a way of restricting the entering of invalid data, such as three ply or four ply, or pink, aqua or orange color, for the brand A toilet paper transaction. Card 118 is utilized in the following manner. An identified portion of the matrix array board 104, such as the portion illustrated in FIG. 3, is overlayed with the product overlay mask card or template 118 corresponding to Brand A, for example, for the particular product, toilet paper in this example. This overlay mask 118 preferably contains through holes or apertures only at the locations of valid product attributes for Brand A, such as in the example of the ply and color of the toilet paper, through holes only being available at the two ply location, and the white, yellow, green, lavender and gold color locations, to expose the crosspoints adjacent these definitions while the one ply, three ply, four ply, pink, aqua and orange color defined positions are masked by the overlay mask 118, as shown by the dotted lines in FIG. 6. Thus, the operator will be unable to contact or see through to the invalid product attribute definitions, such as four ply or orange color for the toilet paper, since that crosspoint associated therwith is covered over by the overlay mask 118.

Preferably, the conventional card edge reader circuit 114, such as a conventional optical card reader, associated with signal lamp 116 which is provided, picks up certain information from the edge of the overlay mask 118, such as by means of a pattern of through holes which may be conventionally read by the conventional optical card reader. As shown and preferred in FIG. 6, this information may typically be an identity code 170 for the terminal or matrix board 104, an identity code for the particular Brand A, such as preferably recorded in binary coded decimal (BCD), represented by code positions 172 through 178, and a product category identify code, such as represented by the two code positions 180 and 182, which code is preferably also in BCD. In addition, as will be described in greater detail hereinafter with reference to FIG. 7, lock out holes 184 and 186 are also preferably provided which holes 184, 186, must be properly aligned before the terminal or primary data entry source 102 is operable. Such proper alignment is preferably indicated by the lighting of signal lamp 116 which alerts the operator that the card 118 has been properly installed. Since the card edge reader 114 can preferably distinguish different overlay mask cards 118 by means of optically reading the associated identity codes 172 and 182, the given crosspoint locations on the matrix array board 104 can be defined differently with different overlay masks in the associated computer program which conveniently analyzes this data. In this manner, the matrix array board 104 provides a generalized data input device that can be utilized for a wide variety of input purposes. Thus, for example, a given crosspoint location on the matrix array board 104 could indicate chocolate flavor if a particular overlay mask 118 was removably installed or inserted in the card edge reader 114 or the same crosspoint location might indicate liquid as opposed to solid if a different overlay mask 118 were removably installed or inserted in the card edge reader 114.

AUXILIARY DATA ENTRY SOURCE

Figure 12:
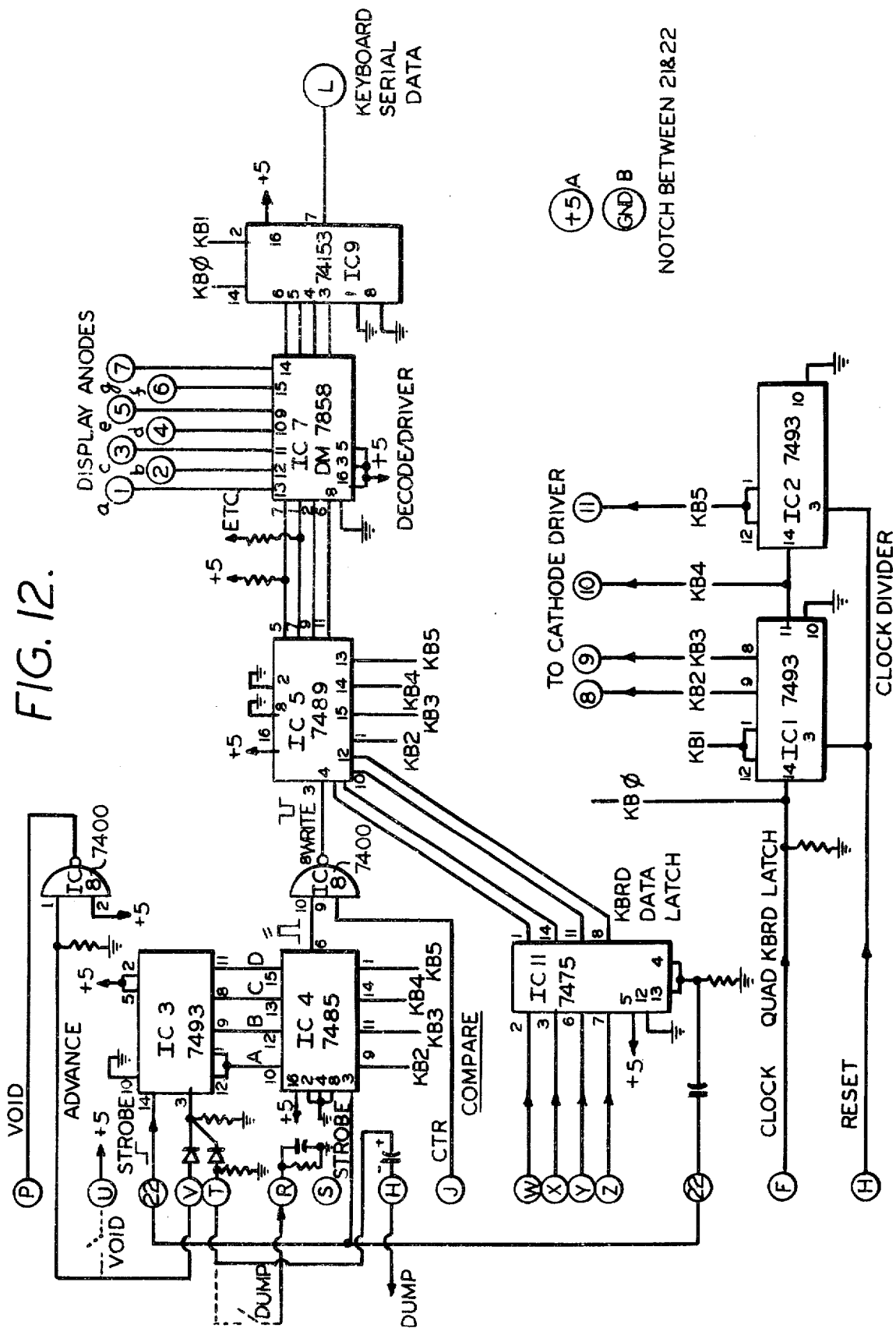
FIG. 12 is a logic schematic diagram, partially in block, of the auxiliary data entry source portion of the system of FIG. 1.

Referring once again to FIG. 1, the auxiliary data entry source 140 which is also preferably provided in the preferred data entry system 100 of the present invention, preferably includes a conventional type of keyboard 190 with an associated 16 digit conventional display 192 and an associated keyboard memory and control circuit 194, with the conventional keyboard electronics being illustrated in greater detail in FIG. 12. The conventional keyboard 190, such as a Keytronic KTC-65-0504-04, preferably contains 16 buttons labeled 0 to 9 and A through F, whose contents is constantly displayed on the 16 digit display 192, such as a conventional LED display which is visible to the operator. This information, as will be described in greater detail hereinafter, is also preferably recorded on the permanent magnetic tape 150 with the keyboard digital data output preferably being in BCD and generally being utilized to record certain relatively unchanging information such as the operator's employee number, during the coding process.

It should be noted that if during the coding process, the operator makes an error on the matrix board, such as recognizing that an incorrect crosspoint has been contacted, the entire entry may be erased in conventional fashion by activating a void entry switch or button 196, to be described in greater detail hereinafter in conjunction with the dump control circuitry 198.

Referring now generally to the dump control circuitry 198 which shall be described in greater detail hereinafter, when an operator has completed the touching or contacting of all crosspoints on the crosspoint matrix board array 104 relating to the historical information to be recorded for a particular product, and is satisfied that the auxiliary data entry source 140 data is proper, the operator then activates a DUMP switch or button 200 termed DUMP ENTRY TO TAPE which causes the contents of the random access memory 112, as well as the contents of the keyboard memory 194 to subsequently conventionally be written on to the permanent tape record 150. The matrix board array random access memory 112 is preferably erased by the transfer of data therefrom thereby enabling the next transaction or data entry to be accomplished. Preferably, however, the keyboard 190 data is not erased from keyboard memory 194 after each transaction since this data is normally stable for a plurality of transactions. If it is desired to change the data in keyboard memory 194, the operator may accomplish this simply by overwriting the previous information with the updated version in conventional fashion by depressing the appropriate keys on the keyboard 190 to update this information. In addition, if desired, the DUMP control button or switch 200 may preferably be arranged at the end of a marking pen so that the operator will automatically cause a mark to be made next to the transaction in the source document from which the information is being obtained as the information is dumped, thus providing an audit trial.

As shown and preferred in FIG. 1, when the temporarily stored information as well as the keyboard information is dumped to the permanent tape 150 by activation of the DUMP switch 200, the information, which is preferably previously in a serial bit format, is provided through a conventional serial-to-four-bit parallel converter 202 for the RAM stored information to four data channels of the tape 150, which is preferably a nine track or channel magnetic tape for recording one bit per channel, and the keyboard information from memory 194, which is also preferably in a serial bit format, is preferably provided through another conventional serial-to-four-bit parallel converter 204 to convert this information which was in serial format to four parallel bits for recording on four different data channels of the tape 150, with one bit being recorded per channel. Thus, the information is recorded on the tape 150 in a bit-by-bit format to provide a bit value map on the tape, with the bit value map in random access memory 112 being the bit value map of the crosspoint matrix array board 104 and with this map being permanently recorded on tape 150 and with the keyboard data being written into the remaining four data channels as standard BCD data characters. The output tape 150 produced by the preferred data entry system 100 of the present invention, which data is in the form of a bit value map, is preferably readable by a conventional computer 206, such as a Model HP-3000 Hewlett-Packard mini-computer, which is conventionally programmed to test each bit in the bit value map and output the proper attribute or its code, if desired, to provide a character format tape 208 at the output of computer 206, or, if desired, the output tape 150 may be directly analyzed by a conventional computer which is appropriately conventionally programmed to interpret this data.

A typical conventional bit value map decoding program executable by the HP-3000 minicomputer is set out by way of example below.

```
1         $CONTROL NOLIST
1.1       C
1.2       C
1.3       C
1.4       C
1.5       C
1.6       C
```

-continued

```
1.7   C
2             CHARACTER*50 BUF(5)
3             CHARACTER*80 BLANK
4             CHARACTER*2 PERIOD
5             CHARACTER*1 CARDIDENT
6             CHARACTER*1 ANSWER
7             INTEGER INTLOGL(128),KEYBOARD(16),LED(8),
8           * TOTAL,CODE,BITPART1,BITPART2,PC,ERROR,FILE(999),BADPC
9             LOGICAL
              LOGL(128),BOARDBITS(992),TEMPLATE(4,16),IFLAG,DUMP
10            LOGICAL CHECK
11            COMMON
              LED,KEYBOARD,BOARDBITS,ERROR,BAD,GOOD,PC,BLANK,
12          * DUMP,CHECK,FILE,NEXT,INDEX,BADPC
13            EQUIVALENCE (LOGL,INTLOGL)
14            DATA TEMPLATE/
15          * 4*.FALSE.,
16          * .TRUE.,3*.FALSE.,
17          * .FALSE.,.TRUE.,2*.FALSE.,
18          * 2*.TRUE.,2*.FALSE.,
19          * 2*.FALSE.,.TRUE.,.FALSE.,
20          * .TRUE.,.FALSE.,.TRUE.,.FALSE.,
21          * .FALSE.,.TRUE.,.TRUE.,.FALSE.,
22          * 3*.TRUE.,.FALSE.,
23          * 3*.FALSE.,.TRUE.,
24          * .TRUE.,.FALSE.,.FALSE.,.TRUE.,
25          * .FALSE.,.TRUE.,.FALSE.,.TRUE.,
26          * .TRUE.,.TRUE.,.FALSE.,.TRUE.,
27          * 2*.FALSE.,2*.TRUE.,
28          * .TRUE.,.FALSE.,2*.TRUE.,
29          * .FALSE.,3*.TRUE.,
30          * 4*.TRUE./
31            BUF(1)="FILE FTN01=RAWBITS/ARMBRUST,OLD"
32            BUF(2)="FILE FTN02=PUTFILE/ARMBRUST,OLD;BUF=1"
33            BUF(3)="FILE FTN03=G,NEW;SAVE;REC=-80,16,F,ASCII"
34            BUF(4)="FILE FTN04=B,NEW;SAVE;REC=-80,16,F,ASCII"
34.1          BUF(5)="FILE FTN08=MSG,NEW;SAVE;CCTL;REC=-80,1,F,ASCII"
35            BUF(1)[48:1]=%15C
36            BUF(2)[48:1]=%15C
37            BUF(3)[48:1]=%15C
38            BUF(4)[48:1]=%15C
38.1          BUF(5)[48:1]=%15C
39            DISPLAY "DO YOU HAVE NON-STANDARD FILE DEFINITIONS"
40            ACCEPT ANSWER
41            IF(ANSWER.EQ.'Y')GO TO 22
42            DO 20 I=1,5
43            CALL COMMAND(BUF(I),II,JJ)
44            IF(.CC.)21,20,21
45       21   STOP 21
46       20   CONTINUE
47       22   CONTINUE
48            BLANK=' '
49            CODE=0
49.1          BADPC=0
50            INDEX=0
51            IFLAG=.TRUE.
52            RERROR=0
53            CHECK=.FALSE.
54            DUMP=.FALSE.
55            ERROR=1
56            BAD=0
57            GOOD=0
58            DISPLAY "DO YOU REQUEST CHECK DIGIT TO BE VERIFIED"
59            ACCEPT ANSWER
60            IF(ANSWER.EQ.'Y')CHECK=.TRUE.
61            PC=32000
62            DISPLAY "WHAT IS PERIOD?"
63            ACCEPT PERIOD
64            DISPLAY "WHAT TYPE OF CARD?"
65            ACCEPT CARDIDENT
66            BLANK[77:1]=CARDIDENT
67            BLANK[71:2]=PERIOD
68            READ(201)FILE,NEXT
69       10   READ(1,END=999,ERR=2003) LOGL
70            INDEX=INDEX+1
71            J=1
72            DO 15 I=1,8
73            KEYBOARD(J)=INTLOGL(I)[4:4]
74            KEYBOARD(J+1)=INTLOGL(I)[12:4]
75            J=J+2
76       15   CONTINUE
77            J=1
78            DO 19 I=1,4
79            LED(J)=INTLOGL(I)[0:4]
80            LED(J+1)=INTLOGL (I)[8:4]
81            J=J+2
82       19   CONTINUE
83            IF(LED(5)+LED(4)+LED(6).NE.0) GO TO 18
84            CODE=CODE+1
85            GO TO 10
86       18   IF(LED(5).LT.10)GO TO 17
87            CALL PROD
88            GO TO 10
```

```
 89         17      J=0
 90                 DO 99 I=5,128
 91                 BITPART1=INTLOGL(I)[0:4]+1
 92                 BITPART2=INTLOGL(I)[8:4]+1
 93                 DO 510 L=1,4
 94                 BOARDBITS(J+L)=TEMPLATE(L,BITPART1)
 95        510     CONTINUE
 96                 J=J+4
 97                 DO 511 L=1,4
 98                 BOARDBITS(J+L)=TEMPLATE(L,BITPART2)
 99        511     CONTINUE
100                 J=J+4
101         99     CONTINUE
102                 CALL EXAMINE
103                 IF(DUMP) GO TO 757
104        527     FORMAT(1H1,T10,'PRODUCTION STATISTICS',///)
105                 GO TO 10
105.1     2003     INDEX=INDEX+1
106                 WRITE(6,1000) INDEX
107       1000     FORMAT(1H ,'TRANSACTION RECORD NO. ',I5,1X,
108            *   'CAUSED READ ERROR')
109                 RERROR=RERROR+1
110                 GO TO 10
111        999     TOTAL=GOOD+BAD+RERROR+CODE+BADPC
112                 CODETIME=CODE*4.551113
113                 WRITE(8,471)
                    TOTAL,GOOD,BAD,RERROR,CODETIME,CODE,BADPC
114        471     FORMAT(1H1,T10,'TOTAL TRANSACTIONS' ,2X,I5,/,
115            *   1H ,T10,'GOOD',T30,I5,/,1H,T10,'BAD',T30,I5,/,
116            *   1H ,T10,'READ ERROR',T30,I5,/,1H ,T10,
117            *   'CODING TIME',T30,F7.2,2X,'MINUTES',
117.1          *   /,1H ,T10,'CODE MARKS', T30,I5,/,
117.2          *   1H ,T10,'INVALID P.C.''S',T30,I5)
118        757     STOP
119                 END
120                 BLOCK DATA
121                 COMMON/INIT/FAKE,FAM
122                 CHARACTER*1 FAKE(16),FAM(39)
123                 DATA FAKE/'0','1','2','3','4','5','6','7','8','9',
124            *   'C','H','J','M','R','S'/
125                 DATA FAM/'1','2','3','4','5','6','7','8','9','0',
126            *   '-','+','A','B','C','D','E','F','G','H','I','J',
127            *   'K','L','M','N','O','P','Q','R','/','S','T','U',
128            *   'V','W','X','Y','Z'/
129                 END
130                 SUBROUTINE EXAMINE
131                 INTEGER KEYBOARD(16),LED(8),ERROR,PC,FILE(999),BADPC
132                 INTEGER
                    BEGINCOL(992),LEGNTH(992),LEDPUTIN(8),KEYPUTIN(16)
133                 LOGICAL BOARDBITS(992),CARDUSED(80),FLAG,DUMP,CHECK
134                 CHARACTER*40 TCARD(2)
135                 CHARACTER*80 CARD,BLANK
136                 CHARACTER*1 FAKE(16),FAM(39)
137                 CHARACTER*8 PUT(992),ITEMP4
138                 COMMON
                    LED,KEYBOARD,BOARDBITS,ERROR,BAD,GOOD,PC,BLANK,
139            *   DUMP,CHECK,FILE,NEXT,INDEX,BADPC
140                 COMMON/JAY/IPC,KEYPUTIN,LEDPUTIN,BEGINCOL,LEGNTH,PUT
141                 COMMON/INIT/FAKE,FAM
142                 EQUIVALENCE (CARD,TCARD)
143                 CARD=' '
144                 CARD=BLANK
145                 FLAG=.FALSE.
146                 DO 478 J=1,80
147        478     CARDUSED(J)=.FALSE.
148                 I=(LED(4)*100)+(LED(5)*10)+LED(6)
149                 IF(I.GT.999) GO TO 58
150                 IF(I.EQ.PC) GO TO 32
151                 PC=I
152                 IF(FILE(I).LE.0)GO TO 57
153                 READ(20FILE(I))IPC,KEYPUTIN,LEDPUTIN,BEGINCOL,
154            *   LEGNTH,PUT
155                 IF(IPC.NO.PD) GO TO 357
156         32     KEYBOARD(2)=(KEYBOARD(1)*10)+KEYBOARD(2)
157                 CARD[1:1]=FAM(KEYBOARD(2))
158                 DO 20 I=3,16
159                 CARD[KEYPUTIN(I):1]=FAKE(KEYBOARD(I)+1)
160         20     CONTINUE
161                 DO 30 I=1,8
162                 CARD[LEDPUTIN(I):1]=FAKE(LED(I)+1)
163         30     CONTINUE
164                 DO 45 I=1,992
165                 IF(.NOT.BOARDBITS(I)) GO TO 45
166                 IF(BEGINCOL(I).EQ.0) GO TO 46
167                 IF(CARDUSED(BEGINCOL(I))) GO TO 50
168                 CARD[BEGINCOL(I):LEGNTH(I)]=PUT(I)
169                 CARDUSED(BEGINCOL(I))=.TRUE.
170                 GO TO 45
171         46     WRITE(6,404)ERROR,I
172        404     FORMAT(1H ,'ERROR SEQUENCE',I6,'BIT',I4,
173            *   'IS ON, NOT VALID FOR THIS PRODUCT CLASS')
174                 FLAG=.TRUE.
175                 GO TO 45
```

-continued

```
176        50     FLAG=.TRUE.
177               WRITE (6,405) ERROR,BEGINCOL(1),PUT(1),I
178        405    FORMAT(1H0,'ERROR SEQUENCE',I6,'ATTEMPTED TO',
179             * 'OVERWRITE COLUMN',I3,' WITH',A8,/,1H ,
180             * 'ACTION SUPPRESSED BIT',I4,'CAUSING ERROR')
181        45     CONTINUE
182               IF(.NOT.CHECK)GO TO 47
183               ICHEKDIGIT=(KEYBOARD(1)*9)+(KEYBOARD(2)*8)+A
                  (KEYBOARD(3)*7)+
184             * (KEYBOARD(4)*4)+(KEYBOARD(5)*3)+(KEYBOARD(6)*2)+
185             * KEYBOARD(7)
186               ICHEKDIGIT=MOD(IMOD,10)
187               IF(IMOD.EQ.0) GO TO 47
188               WRITE(6,406) ERROR,(KEYBOARD(LL),LL=1,7)
189        406    FORMAT 1H0,'ERROR SEQUENCE',I6,'INVALID FAMILY'
190             * NUMBER 4,3I1,'-',4I1)
191               FLAG=.TRUE.
192        47     IF(.NOT.FLAG) GO TO 48
193               BAD=BAD+1
194               FLAG=.FALSE.
195               WRITE(6,407) ERROR,TCARD
196               WRITE(4,408) CARD
197               ERROR=ERROR+1
198               GO TO 49
199        407    FORMAT(1H , ERROR',1X,I5,T20,H40,/,',T20,40('.'),/,
200             * 1H,T20,A40)
201        408    FORMAT(A80)
202        48     WRITE(3,408) CARD
203               GOOD=GOOD+1
204               GO TO 49
205        57     WRITE(6,627)LED(4),
                  LED(5),LED(6),LED(8),(KEYBOARD(I),I=1,6),
205.1           * (KEYBOARD(I),I=9,16)
206        627    FORMAT(1H,'PC FOR THIS TRANSACTION NOT ON SPEC FILE',
207             * 'CANNOT CREATE CARD',
208             * 'NINE',/,1H,T5,'PRODUCT CLASS:',3I1,'TERMINAL',
209             * I2,'FAMILY NO. ',6I1,/,1H,'BATCH',3I1,
210             * 'CODER',2I1,'MO/YR',2I1,'/7',I1)
211               PC=32000
212               BADPC=BADPC+1
213               GO TO 49
214        58     WRITE(6,375) INDEX,I
214.1             BADPC=BADPC+1
215        375    FORMAT(1H,'RECORD',I5,'IN ERROR PC TO LARGE',I5)
216               GO TO 49
217        357    WRITE(6,414) PC,IPC,INDEX
218        414    FORMAT(1H,'PRODUCT CLASS',I3,'ATTEMPTING TO',
219             * 'OPERATE ON SPEC FILES OF P.C.',I4,/,1H,'RECORD NO.',I5,
220             * 'PROGRAM TERMINATED')
221               DUMP=.TRUE.
222        49     RETURN
223               END
224               SUBROUTINE PROD
225               INTEGER KEYBOARD(16),LED(8)
226               COMMON LED,KEYBOARD
227               GO TO (10,20,40) ,LED(6)
228        10     WRITE(6,100)(KEYBOARD(I),I=1,7),(KEYBOARD(I),I=9,16)
229               GO TO 40
230        20     WRITE(6,200)(KEYBOARD(I),I=1,3),(KEYBOARD(I),I=9,16)
231               GO TO 40
232        40     RETURN
233        100    FORMAT(1H,'WORK IN PROCESS','GROUP',1X,3I1,1X,
234             * 'NO..CODED',1X,4I1,1X,'BATCH',1X,3I1,1X,'CODER',
235             * 1X,2I1,1X,'MO/YR',1X,2I1,'/7',I1)
236        200    FORMAT(1H,'BATCH COMPLETE GROUP',3I1,'BATCH',
237             * 3I1,'CODER',2I1,'MO/YR',2I1,'/7',I1)
238               END
```

As is also shown and preferred in FIG. 1, a plurality, such as eight, of primary data entry source 102 and associated auxiliary data entry sources 140, each having its own associated memories 112 and 194, respectively, may be operated in data entry system 100 at the same time with a common permanent tape record 150 being provided by time division multiplexing of both the data entry and dumping functions by use of conventional clock and reset circuitry 210, to be described in greater detail hereinafter, so as to thereby enable the use of multiple terminals without interference. As further shown and preferred in FIG. 1, if desired a conventional timing record counter 212 may be provided for the system 200 which divides the 60 cycle line frequency supplied to power the system 100 so as to provide a timing record for the tape 150 at predetermined intervals, such as every four minutes. This timing record may be utilized by subsequent computer processing to analyze operator efficiency as well as for other auditing purposes.

As further shown and preferred in FIG. 1, if desired, a conventional diagnostic bit counter 214, such as one which is four BCD channel selectable, may be provided so as to provide a visible decimal output counter which can be set to count bits transferred at strategic points in the system 100, thus allowing on site maintenance and verification of proper operation system 100 without the need for specialized equipment. If such a counter 214 is utilized with the system 100 during normal operation, the counter 214 may preferably be set to count transactions loaded to the tape 150, thus providing a control total for subsequent processing. An external input is preferably provided to the counter 214 to enable, for example, the various clock frequencies present in the system 100, to be described in greater detail hereinafter, to be counted during routine maintenance to also provide a gross check on system 100 operation.

Probe Data Entry

Figure 7:
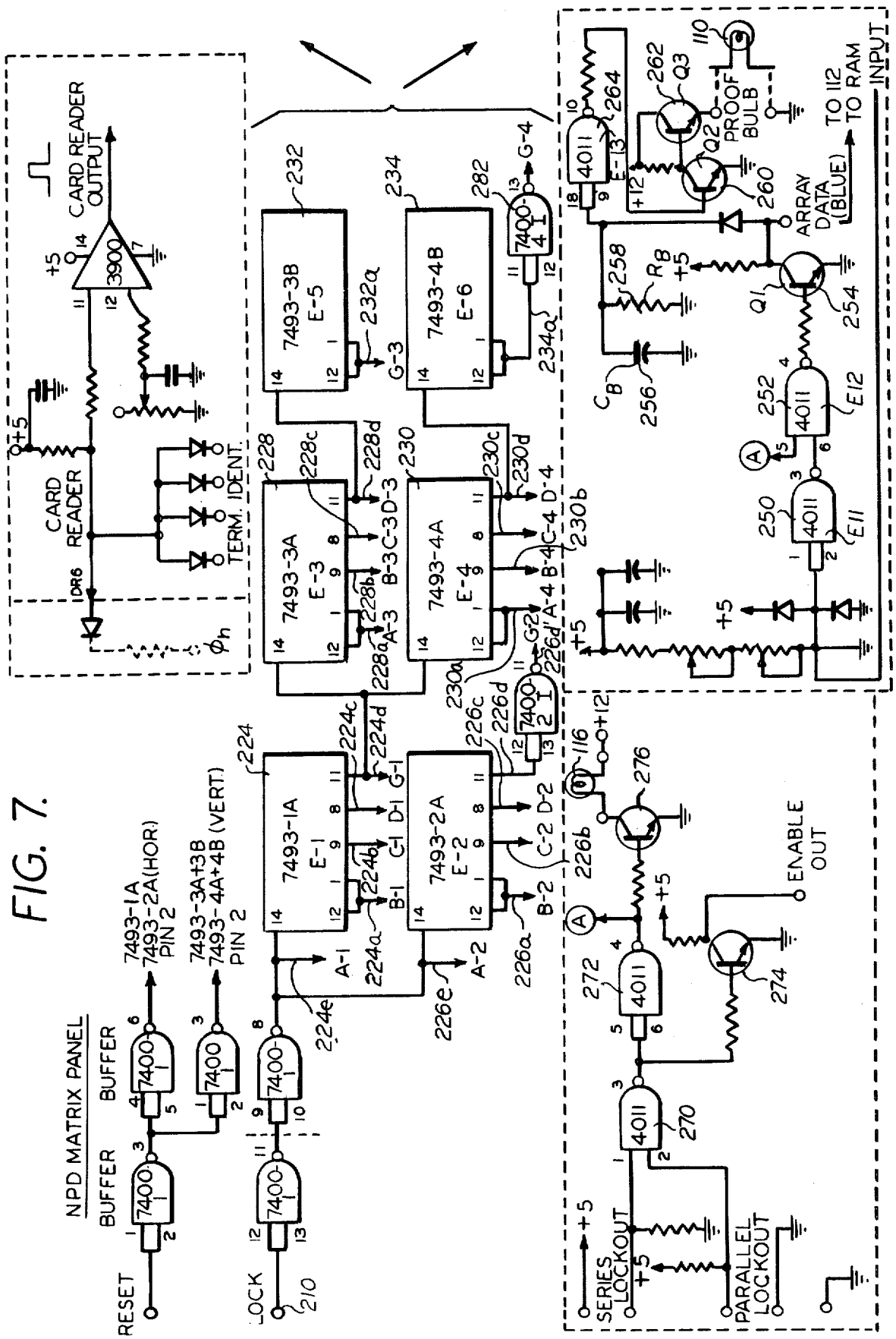
FIGS. 7 and 8, taken together, is a logic schematic diagram, partially in block, of the preferred primary data entry source portion of the system of FIG. 1.
Figure 8:
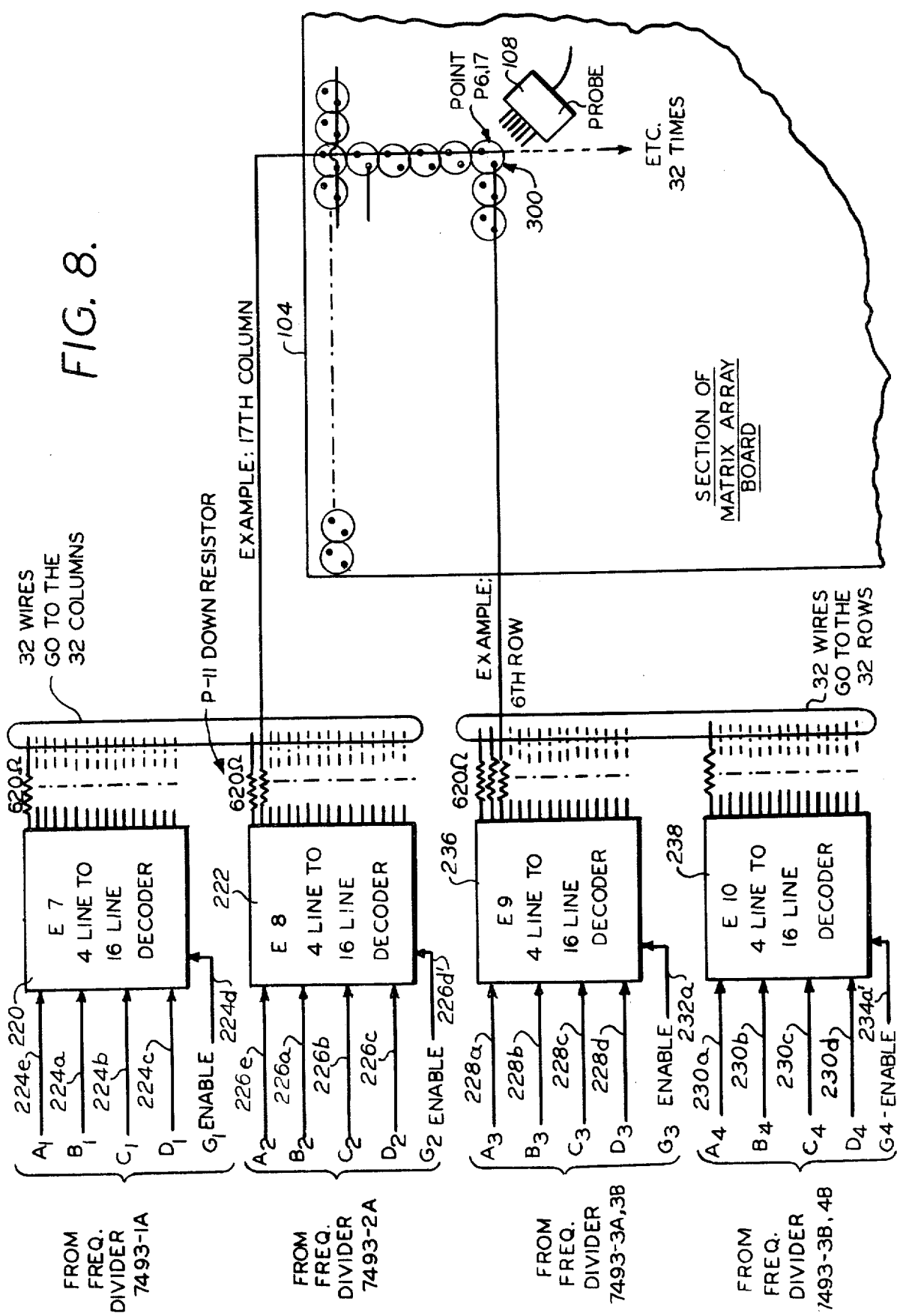

Referring now to FIGS. 7 and 8, the entry of data via the operator's entry probe or electrical contact probe 108 shall be described. The array control 120 and array scanning 106 circuitry are shown in greater detail in FIGS. 7 and 8. Since the matrix array board 104 is preferably a 32-by-32 array, the columns of system 100 are preferably scanned by a 32 line conventional decoder, such as one composed of two conventional 16 line decoders 220 and 222 which are 4-line-to-16-line decoders such as a Signetics 74154, which are clocked by the clock frequency provided by conventional counters 224 and 226, such as conventional Signetics 7493 counters. This frequency is preferably further divided by conventional counters 228, 230, 232 and 234, such as Signetics 7493 counters and used to clock a second conventional 32 line decoder, such as one also preferably composed of two conventional 16 line decoders such as Signetics 74154, although, if desired, if a conventional 32 line decoder is available one may be utilized in place of the two 16 line decoders 236 and 238, which are conventional 4-line-to-16-line decoders which are utilized as the scanner for the rows of the array 104. In this manner, the columns of crosspoints of the array 104 are preferably scanned at 32 times the rate used for the rows comprising the crosspoint array 104 with the crosspoints on the matrix array board 104 preferably being physically scanned from left-to-right row-by-row, as will be described in greater detail hereinafter. A series resistor, such as preferably a 620 ohm series resistor, is provided for each of the columns and each of the rows, with only an illustrative portion of these series resistors being illustrated in FIG. 8, the balance of these series resistors being omitted from the drawing of FIG. 8 for purposes of clarity, in each output of each of the 16 line decoders 220 through 238. Thus, at any point in time, a unique combination of row and column series resistors will be connected, corresponding to a unique RAM address in RAM 112 since both RAM 112 and the row/column scanners comprising decoders 220 and 222 and 236 and 238 and counters 224 through 234, inclusive, are addressed by the same common clock 210, to be described in greater detail hereinafter with reference to FIG. 11. Thus, the probe 108, if it is touching or contacting any crosspoint, which is at the junction of a row and column, at the time that the associated series resistors for that row and column are grounded by the line 16 decoders 220 through 238, the voltage at the input to a conventional two input NAND gate 250, previously held high, will be pulled down by the voltage drop contributions of both the row and column series resistors, the voltage drop from either row or column alone being of insufficient magnitude to cause a data bit to be written. The output of the NAND gate 250 provides the data bit to the RAM 112 through another conventional NAND gate 252 whose output is connected to the base of a conventional transistor 254 whose collector output is the bit input to RAM 112. At the same time, the probe signal lamp 110 is preferably turned on to signify to the operator that the proper bit has been loaded into RAM 112 with the signal lamp 110 preferably being maintained in an on condition for a sufficient amount of time for the operator to observe it adequately by means of a conventional RC hold circuit composed of capacitor 256 and resistor 258, such as preferably a 0.05 mf capacitor and a 1 megohm resistor. The lamp driver for the signal lamp 110 is preferably composed of transistors 260 and 262 with transistor 260 being maintained on during the discharge of capacitor 256 through a conventional NAND gate 264. As was previously described with reference to FIG. 6, logical lockout of the primary data entry source 102 is preferably provided if an overlay mask 118 is not properly inserted in the card edge reader 114, assuming such a mask 118 is utilized. This is conventionally accomplished by a conventional logic circuit arrangement also illustrated in FIG. 7 comprising conventional NAND gates 270 and 272 which are, respectively, operatively connected to the bases of conventional transistor 274 and 276, with the collector of transistor 276 driving or turning on the signal lamp 116 when transistor 276 is turned on.

As shown and preferred in FIGS. 7 and 8, the outputs of counter 224 are respectively labeled 224a, 224b, 224c and 224d, with the input to counter 224 being labeled 224e and the input to counter 226 being labeled 226e; the outputs of counter 226 are respectively labeled 226a, 226b, 226c, and 226d, with output 226d being passed through a conventional logic inverter 280 to provide the inverted output 226d'; the outputs of counter 228 are respectively labeled 228a, 228b, 228c and 228d; the outputs of counter 230 are respectively labeled 230a, 230b, 230c, and 230d; the output of counter 232 is labeled 232a; and the output of counter 234 is labeled 234a and passed through another conventional logic inverter 282 to provide the inverted output 234a'. Output 224d to decoder 220 is the enable input therefor and when it is logically on, the first 16 crosspoints are preferably scanned horizontally because the 16 output lines of decoder 220 are activated sequentially based on the address provided on input lines 224e, 224a, 224b and 224c since decoder 220 is on due to the enable pulse provided via path 224d. After these 16 crosspoints are scanned, an enable pulse is provided via path 226d' from counter 226 to activate or enable decoder 222 which then causes the horizontal scanning of the remaining 16 adjacent crosspoints across in that row so as to complete the 32 crosspoint horizontal scan of the first row, with the addresses for the remaining 16 points being provided via paths 226e, 226a, 226b and 226c to decoder 222. Following the cross scanning of the first row, decoder 236 receives a new address from the slower counters 228 and 232, which are preferably 1/32 times as fast as the horizontal scan frequency, with the enable pulse being provided via path 232a for decoder 236 and the row address being provided via paths 228a, 228b, 228c and 228d and, thus, advances to the second row, which is then horizontally scanned across, in the manner described above, by decoders 220 and 222, this being repeated for the first 16 rows down under control decoder 236 with the remaining 16 rows down being similarly controlled by means of decoder 238 which is enabled via path 234a' with the start of the 17th row to be scanned with the addresses for rows 17 through 32 being provided via paths 230a, 230b, 230c and 230d to decoder 238 and the cross scanning of these rows being accomplished in the same manner as described above via decoders 220 and 222. Thus, by this synchronous scanning of the rows and columns with the same clock 210 which addresses the RAM 112, the series resistors, one being provided for each row and one for each column, are connected at any point in time to only one unique crosspoint location in the array 104 with the electrical contact of the probe 108 touching a given point, such as crosspoint 300 (representing, by way of example the sixth row and 17th column in array 104) illustrated in FIG. 8, resulting in the completion of a series closed circuit which, by means of the connected series resistors, causes a voltage to set or write a bit whose logic value is now a one, when the probe contact is accomplished to close the circuit, in the RAM 112 at the proper unique bit address therefor since the RAM 112 is clocked from the same clock 210 as the row and column scan. If at the time a given crosspoint is scanned there is no contact of the probe 108 so as to complete the circuit, then preferably a logic zero remains in that unique bit address in the RAM 112.

Clock and Reset Circuit

Figure 11:
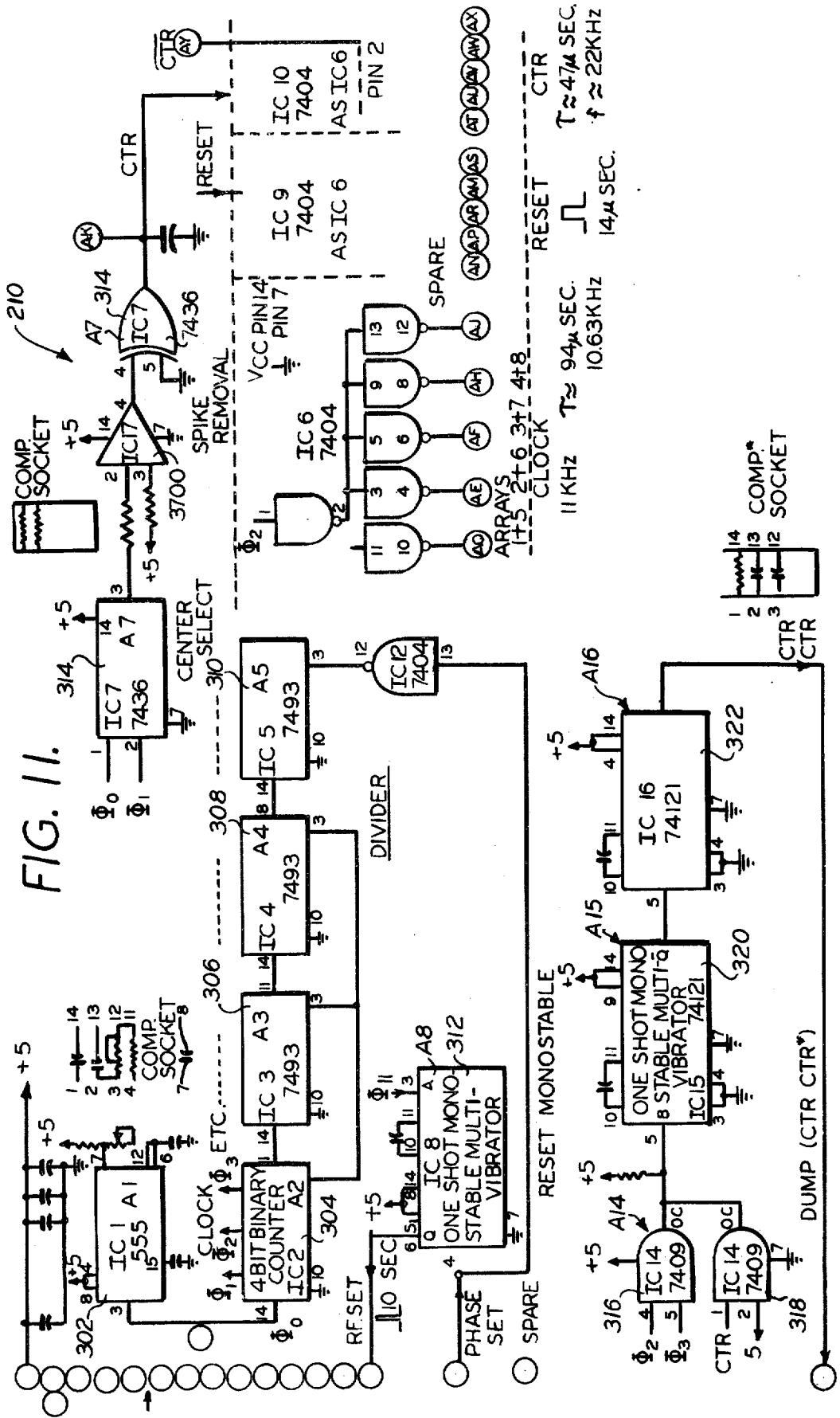
FIG. 11 is a logic schematic diagram, partially in block, of the clock and reset portion of the system of FIG. 1.

Referring now to FIG. 11, the preferred conventional clock 210 used for clocking the RAM 112 and the array scanning circuitry 106 described above with reference to FIGS. 7 and 8 shall now be described. The conventional clock 210 preferably comprises a conventional integrated circuit local oscillator 302 such as a National semiconductor 555 whose frequency is preferably divided by four conventional four bit counters 304, 306, 308 and 310, such as Signetics 7493 counters, preferably connected in series to produce at least ten monotonically decreasing output signal frequencies which are provided to the various portions of the data entry system 100 as required. The lowest frequency provided, which is preferably the output of counter 310, fires a conventional one shot monostable multivibrator 312, such as a Signetics 74121, which provides a reset pulse each operating cycle. The frequency of the local oscillator 302 is preferably chosen to result in an overall operating cycle sufficiently short in time so that a plurality of individual operators sharing the common permanent tape record via time division multiplexing would experience negligible response delay; however, the operating cycle must also preferably be of long enough duration so as to provide for a sufficiently rich range of intermediate, that is higher, frequencies in which to accomplish all clocked bit data transfers, such as time cycle of 1/20 Sec, or an intermediate frequency range of 11,000 $H_z$. The frequency of local oscillator 302 is preferably exclusively ORed in conventional exclusive ORgate 314 with its own first harmonic undertones, which is provided at the output of counter 310, resulting in the output of a center pulse. In general, this center pulse output of gate 314 is utilized throughout the data entry system 100 to AND with data so as to subsequently generate output only after sufficient settling time thus eliminating rise and fall time noise and making arrival time of data over possibly varing lengths of cables less critical. Furthermore, by utilizing this center pulse to AND with the data, the data is recleaned and locally resynched each time it is ANDed with the center pulse. Similarly, a center-center pulse is developed in conventional AND gates 316 and 318 and conventional one shot multivibrators 320 and 322 with this center-center output pulse being utilized in the DUMP control circuit 198 to handle already centered data. The balance of the clock 210 is conventional and will not be described in any greater detail hereinafter.

Dump Control Circuit

Figure 9:
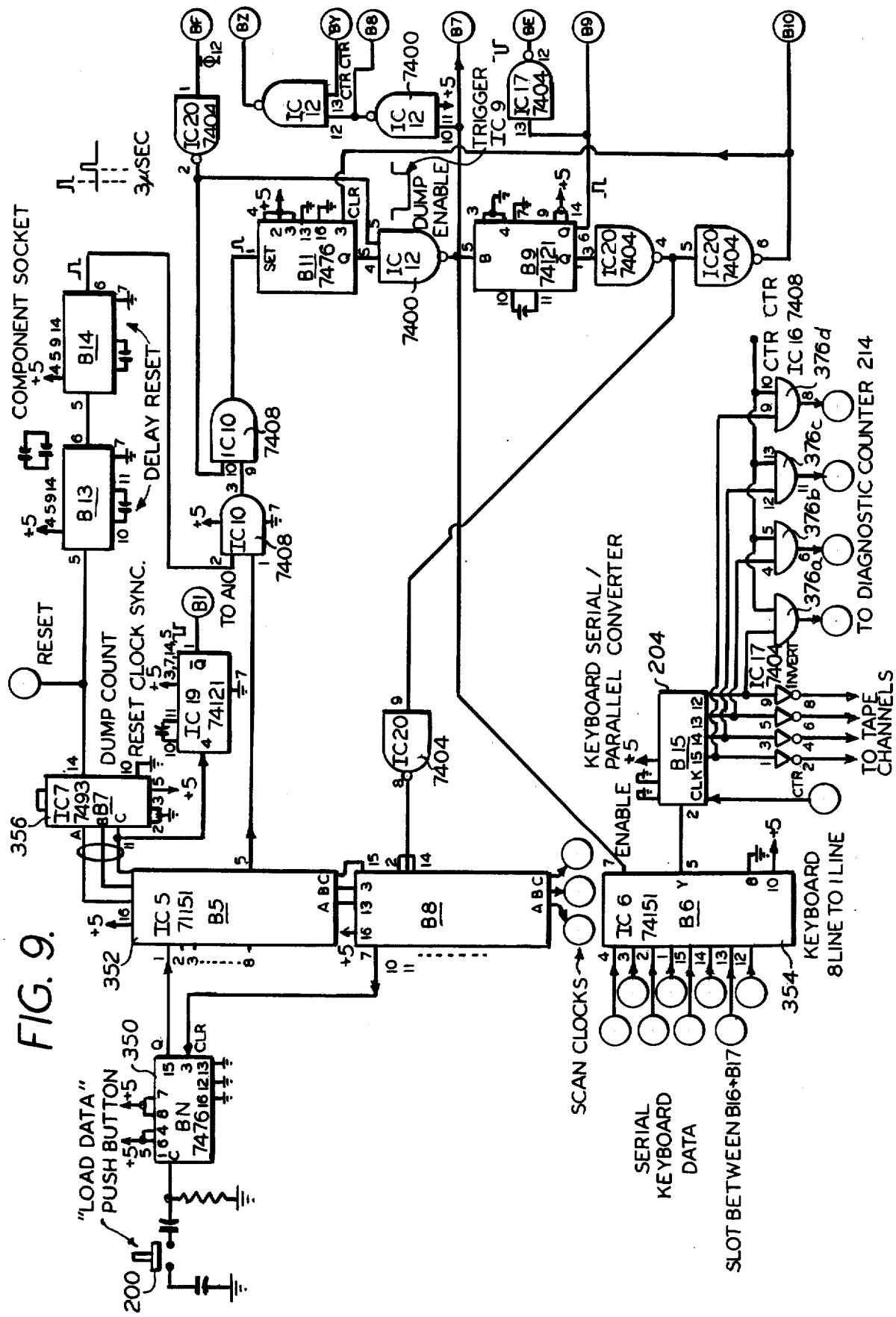
FIGS. 9 and 10, taken together, is a logic schematic diagram partially in block, of the dump control portion of the system illustrated in FIG. 1.
Figure 10:
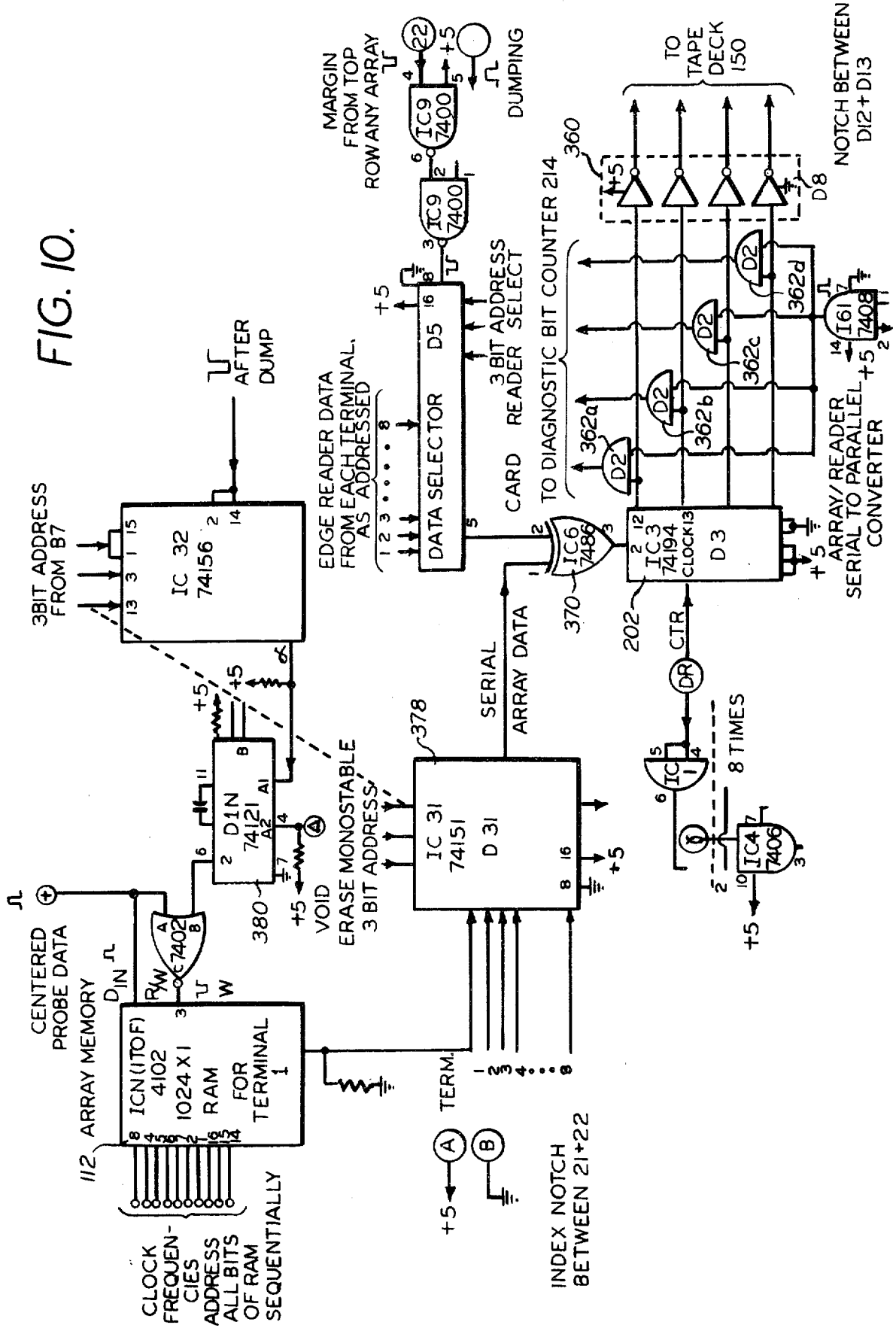

Referring now to FIGS. 9 and 10, the dump control circuitry 198 of the preferred data entry system 100 of the present invention shall now be described. In the data entry system 100, whether time division multiplexing of a plurality of data entry sources 102 and 140 or only one such data source 102 and 140 is utilized, when any of the data entry terminal operator's activates the DUMP or LOAD DATA switch or button 200, a conventional J-K master-slave flip-flop 350. such as a Signetics 7476, is set and preferably activates an eight bit data selector/multiplexer 352/354, such as conventional Signetics 74151 multiplexers, which are also preferably addressed by the output of a conventional four bit binary counter 356, such as a conventional Signetics 7493 counter. Preferably only three bits of the counter 356 are utilized, this being sufficient to address eight data entry terminals, in the example being described, assuming that eight data entry terminals are time division multiplexed to share a common permanent tape record. The data selectors 352 and 354 preferably operate concurrently, one enabling dumping of the matrix array board RAM 112 while the other enables dumping of the keyboard data memory 194, data selector 352 controlling the dumping of the RAM 112 and data selector 354 controlling the dumping of the keyboard memory 194. The data entered on the associated matrix array board 104 and which is temporarily stored in the RAM 112 prior to the DUMP COMMAND, is preferably output from the RAM 112 serially and, as previously mentioned, conventionally converted to a four bit parallel form by conventional serial-to-four-bit-parallel shift register 202. This four bit parallel output of shift register 202 is preferably delivered to four data channels, as previously mentioned, of the magnetic tape recorder 150 after preferably being inverted, so as to match industry standards, by conventional inverting circuitry 360. This four bit parallel data output from the matrix array 104 is also preferably supplied to the diagnostic bit counter/display 214 through conventional buffers 362a through 362d. The first row of 32 positions on the matrix board array 104, and consequently the space for the first 32 bits in the associated matrix array RAM 112, are preferably usurped by the card edge reader 114 which reads certain information, as previously mentioned, in the inserted overlay mask cards 118 which, as previously mentioned, is preferably inserted in a conventional optical card reader 114 such as between light emitting diodes and photo-conductors with this edge coded information, as previously mentioned, being important in interpreting the meaning of each bit in the bit value map in subsequent computerized decoding of the bit value map generated. Preferably, the edge reader data is read first by testing the states of the photo-transistors and is exclusive ORed by means of a conventional exclusive ORgate 370 with the serial matrix array data so as to lock out the normal first row of matrix crosspoints while the edge reader data is scanned. Upon completion of the first 32 edge reader data bits, preferably the serial array data controls the exclusive OR 370 and is transferred to the magnetic tape 150 in the manner previously described. During the DUMP function, the data delivered to the magnetic tape unit 150 is preferably clocked at 372 with the center pulse to insure that no transients or timing problems create error conditions. In a similar manner, the keyboard data from keyboard memory 194 is delivered to the remaining four data channels of the magnetic tape unit 150. The keyboard data as was previously mentioned, is preferably received from the keyboard memory 194 in serial form through multiplexer 354 and is preferably converted into four bit parallel form by conventional serial-to-four-bit parallel shift register 204 which is strobed by the center pulse previously described. The keyboard data is also preferably delivered to the diagnostic bit counter 214 through conventional buffers 376a through 376b, as well as being ANDed with the center-center pulse. Preferably, immediately following the transfer of data to the magnetic tape unit 150, in the manner described above, a conventional multiplexer 378, such as a Signetics 74156 multiplexer, is enabled and addressed by the binary counter 356 and, thereafter, triggers another conventional monostable multivibrator 380, such as a Signetics 74121, which then writes all logic zeros into the RAM 112 for at least one memory cycle thus erasing all stored bits. Following this erase operation, the primary data source terminal 102 is ready to be utilized by the operator to enter the next set of data. The operator, as previously mentioned, can also command an erase cycle at any time by depressing the VOID ENTRY switch or button 196 thus firing the erase monostable multivibrator 380.

Keyboard Electronics

Referring now to FIG. 12, the conventional keyboard electronics associated with auxiliary data entry source 140 is shown. Four data bits from the keyboard 190 are written into a 64 bit memory 510, such as a Signetics 7489, subsequent to their temporary storage in a data latch 520, such as a Signetics 7475. Digits are entered in the proper sequence and position by means of a four-bit comparator 530, such as a Signetics 7485, and counter 540, such as a Signetics 7493. Up to 16 digits can thus be entered and displayed to the operator by means of conventional seven-segment display LED's, which are driven by the decoder/driver 550, such as a Signetics DM 7578. Clock and timing signals are provided by four-bit counters 560, 561, such as Signetics 7493 counters. Upon initiation of the DUMP command, data is transmitted out of the keyboard to the tape drive for permanent storage. The data is transmitted after conversion to serial BCD form by the parallel to serial converter 570, such as a Signetics 74153. Operation of the keyboard electronics illustrated in FIG. 12 is conventional and will not be described in any greater detail hereinafter.

Timing Record

Figure 13:
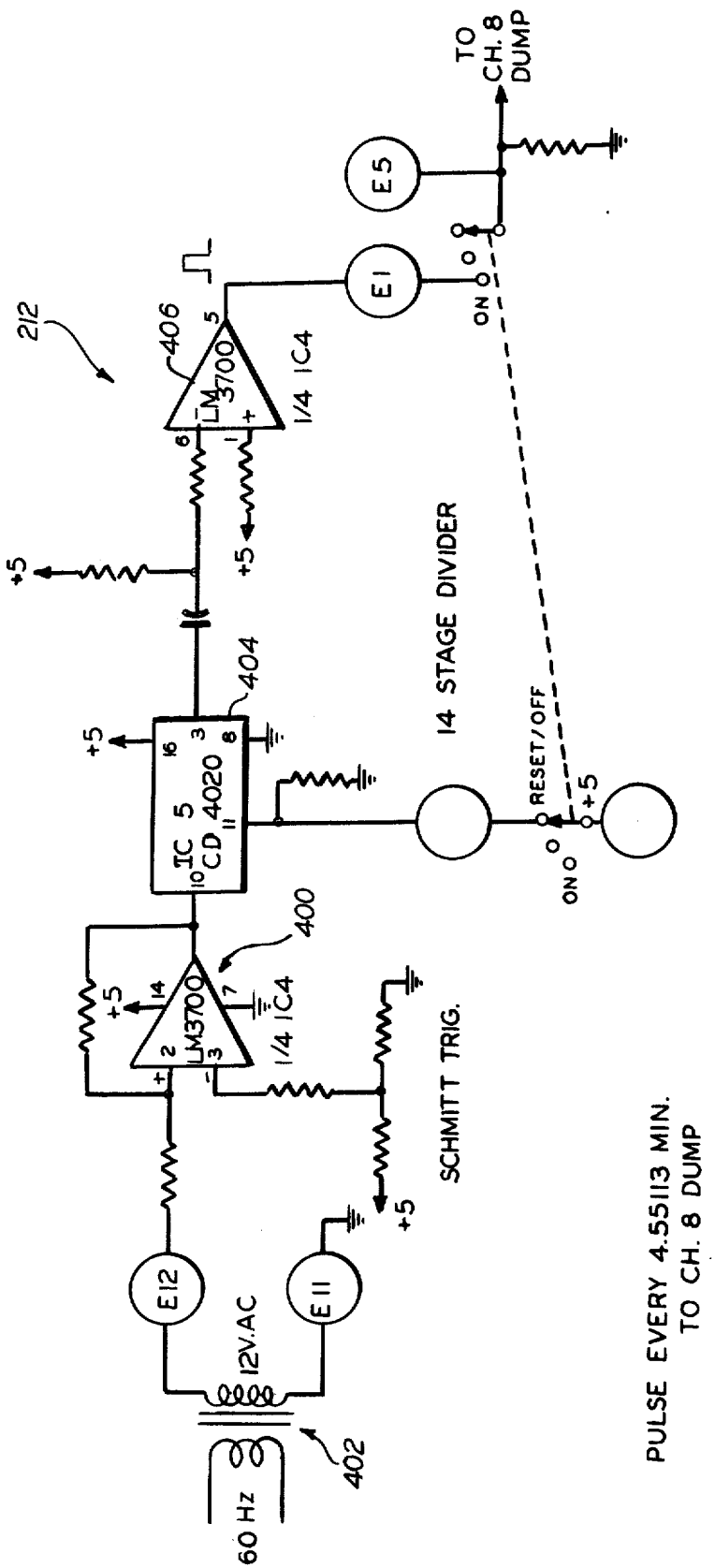
FIG. 13 is a logic schematic diagram, partially in block, of the timing record portion of the system of FIG. 1.

Referring now to FIG. 13, the timing circuit 212, which is preferably conventional, is shown. This circuit 212, which is conventional, preferably includes a conventional Schmitt trigger 400 connected to the conventional 60 cycle line frequency 402, which trigger 400 has its output provided to a conventional 14 stage divider 404 such as a RCA CD 4020, whose output is in turn fed through a conventional operational amplifier 406 such as a National Semiconductor LM 3900 to provide a timing record at the appropriate time intervals and which record is recorded among the regular data records, but can be recovered by virtue of the fact that it is an all zero record, thus distinguishable from ordinary data records.

By utilizing the data entry system of the present invention, an efficient system for entering historical information such as market survey information, is provided. As used throughout the specification and claims, the term "attribute" by itself is meant to refer to a general category of specific attributes, such as possible prices, whereas the term "definition" is meant to refer to a specific attribute of such a general category of attributes, such as a given value for the price.

What is claimed is:

1. A data entry system for providing a computer readable record of information relating to at least one common subject having a plurality of different possible general categories of attributes, at least two of said different general categories of attributes each comprising a plurality of different selectable specific attributes, said system comprising at least one electrical crosspoint matrix array of a plurality of open circuit electrical contact crosspoints, each of said crosspoints having indicia means adjacent thereto corresponding to and identifying one of said selectable specific attributes for one of said possible general categories of attributes and having an open circuit state corresponding to one value of a digital data bit corresponding to the absence of said associated specific attribute of said general category of attributes associated with that crosspoint and a closed circuit state corresponding to a different value of said digital data bit corresponding to the presence of said associated specific attribute of said general attribute category associated with that crosspoint; electrical contact probe means for selectively changing the value of said bit associated with one of said crosspoints by selectively contacting said one crosspoint; addressable temporary storage means having a plurality of different bit addresses; means for synchronously scanning said temporary storage means and said crosspoint matrix array for selectively connecting each of said crosspoints to an associated unique bit address in said temporary storage means to provide the value of said synchronously scanned crosspoint associated bit thereto at the time of said synchronous scan of said crosspoint for providing a bit value map of said crosspoint array in said temporary storage means, said temporary storage means being selectively connectable to each of said crosspoints for recording the state of said synchronously scanned associated bit at said associated unique bit address for recording the presence or absence of said associated specific attribute of said general category of attributes associated with said synchronously scanned crosspoint; magnetic storage means for permanently storing at least said crosspoint array bit value map, said permanently stored crosspoint array bit value map being computer readable for providing said computer readable information record; and means operatively connected between said temporary storage means and said permanent storage means for selectively dumping at least said temporarily stored crosspoint array bit value map to said permanent magnetic storage means for permanent storage thereof, said selective dumping means comprising means for erasing said temporary storage means when said temporarily stored crosspoint array bit value map is selectively dumped to said permanent magnetic storage means; said probe means comprising signalling means for providing an indication to an operator thereof that said data bit associated with the crosspoint being contacted by said probe means at a particular time has been loaded into said temporary storage means, said signalling means being enabled to provide said indication when said probe means contacted crosspoint is synchronously scanned to selectively connect said synchronously scanned crosspoint to the unique bit address in said temporary storage means associated therewith.

2. A data entry system in accordance with claim 1 wherein said synchronous scan of said crosspoint completes a feedback circuit to said signalling means to provide said indication therefrom, said feedback circuit including delay means having an associated delay time, said delay time being selected to maintain said indication provision for a sufficient time to insure observation thereof by the operator.

3. A data entry system in accordance with claim 1 wherein said signalling means comprises a signal lamp, said signal lamp being turned on to provide a visual indication when said signalling means is enabled.

4. A data entry system for providing a computer readable record of information relating to at least one common subject having a plurality of different possible general categories of attributes, at least two of said different general categories of attributes each comprising a plurality of different selectable specific attributes, said system comprising at least one electrical crosspoint matrix array of a plurality of open circuit electrical contact crosspoints, each of said crosspoints having indicia means adjacent thereto corresponding to and identifying one of said selectable specific attributes for one of said possible general categories of attributes and having an open circuit state corresponding to one value of a digital data bit corresponding to the absence of said associated specific attribute of said general category of attributes associated with that crosspoint and a closed circuit state corresponding to a different value of said digital data bit corresponding to the presence of said associated specific attribute of said general attribute category associated with that crosspoint; electrical contact probe means for selectively changing the value of said bit associated with one of said crosspoints by selectively contacting said one crosspoint; addressable temporary storage means having a plurality of different bit addresses; means for synchronously scanning said temporary storage means and said crosspoint matrix array for selectively connecting each of said crosspoints to an associated unique bit address in said temporary storage means to provide the value of said synchronously scanned crosspoint associated bit thereto at the time of said synchronous scan of said crosspoint for providing a bit value map of said crosspoint array in said temporary storage means, said temporary storage means being selectively connectable to each of said crosspoints for recording the state of said synchronously scanned associated bit at said associated unique bit address for recording the presence or absence of said associated specific attribute of said general category of attributes associated with said synchronously scanned crosspoint; magnetic storage means for permanently storing at least said crosspoint array bit value map, said permanently stored crosspoint array bit value map being computer readable for providing said computer readable information record; and means operatively connected between said temporary storage means and said permanent storage means for selectively dumping at least said temporarily stored crosspoint array bit value map to said permanent magnetic storage means for permanent storage thereof, said selective dumping means comprising means for erasing said temporary storage means when said temporarily stored crosspoint array bit value map is selectively dumped to said permanent magnetic storage means; said permanent magnetic storage means comprising a multichannel magnetic tape having a plurality of data storage channels and means for recording said permanently stored crosspoint array bit value map in at least a portion of said plurality of channels.

5. A data entry system for providing a computer readable record of information relating to at least one common subject having a plurality of different possible general categories of attributes, at least two of said different general categories of attributes each comprising a plurality of different selectable specific attributes, said system comprising at least one electrical crosspoint matrix array of a plurality of open circuit electrical contact crosspoints, each of said crosspoints having indicia means adjacent thereto corresponding to and identifying one of said selectable specific attributes for one of said possible general categories of attributes and having an open circuit state corresponding to one value of a digital data bit corresponding to the absence of said associated specific attribute of said general category of attributes associated with that crosspoint and a closed circuit state corresponding to a different value of said digital data bit corresponding to the presence of said associated specific attribute of said general attribute category associated with that crosspoint; electrical contact probe means for selectively changing the value of said bit associated with one of said crosspoints by selectively contacting said one crosspoint; addressable temporary storage means having a plurality of different bit addresses; means for synchronously scanning said temporary storage means and said crosspoint matrix array for selectively connecting each of said crosspoints to an associated unique bit address in said temporary storage means to provide the value of said synchronously scanned crosspoint associated bit thereto at the time of said synchronous scan of said crosspoint for providing a bit value map of said crosspoint array in said temporary storage means, said temporary storage means being selectively connectable to each of said crosspoints for recording the state of said synchronously scanned associated bit at said associated unique bit address for recording the presence or absence of said associated specific attribute of said general category of attributes associated with said synchronously scanned crosspoint; magnetic storage means for permanently storing at least said crosspoint array bit value map, said permanently stored crosspoint array bit value map being computer readable for providing said computer readable information record; and means operatively connected between said temporary storage means and said permanent storage means for selectively dumping at lest said temporarily stored crosspoint array bit value map to said permanent magnetic storage means for permanent storage thereof, said selective dumping means comprising means for erasing said temporary storage means when said temporarily stored crosspoint array bit value map is selectively dumped to said permanent magnetic storage means; said system further comprising a plurality of said crosspoint matrix arrays each having an associated one of said addressable temporary storage means, an associated one of said probe means, and an associated one of said selective dumping means, said permanent magnetic storage means being common to said plurality of temporary storage means, said synchronous scanning means comprising time division multiplexing means common to all of said matrix arrays and associated temporary storage means and selective dumping means for time division multiplexing the storage of said plurality of temporarily stored crosspoint array bit value maps and the selective dumping thereof to provide a time division multiplexed computer readable record of said plurality of selectively dumped temporarily stored bit value maps on said common permanent magnetic storage means by enabling said selective dumping thereto in accordance with said time division multiplexing.

6. A data entry system in accordance with claim 5 wherein each of said temporary storage means comprises an eraseable random access memory means.

7. A data entry system in accordance with claim 6 wherein said common permanent magnetic storage means comprises a multichannel magnetic tape having a plurality of data storage channels and means for recording each of said permanently stored crosspoint array bit value maps in at least a portion of said plurality of channels.

8. A data entry system in accordance with claim 5 further comprising a keyboard input auxiliary data source means associated with at least one of said plurality of crosspoint matrix arrays for providing a record of additional information common to a plurality of different subjects, said keyboard means having a digital output corresponding to said additional information, said associated selective dumping means being further operatively connected between said keyboard means and said permanent storage means for simultaneously providing said keyboard means digital output to said permanent storage means along with said temporarily stored crosspoint array bit value map when said temporarily stored bit value map is selectively dumped for providing a homogenous computer readable record.

9. A data entry system in accordance with claim 5 wherein said information comprises market survey information and said common subject comprises a particular product, said indicia means comprising means identifying selectable specific attributes of said general categories of attributes associated with said particular product, said permanently stored bit value map comprising said computer readable record of said market survey information relating to said particular product.

* * * * *